US012793624B2

(12) United States Patent
Han et al.

(10) Patent No.: US 12,793,624 B2
(45) Date of Patent: Nov. 10, 2026

(54) DISPLAY DEVICE COMPRISING A TIMING CONTROLLER THAT RECEIVES A TEST OUTPUT SIGNAL

(71) Applicant: LG Display Co., Ltd., Seoul (KR)

(72) Inventors: Sangwoo Han, Paju-si (KR); Dohyeon Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/277,117

(22) Filed: Jul. 22, 2025

(65) Prior Publication Data

US 2026/0148683 A1 May 28, 2026

(30) Foreign Application Priority Data

Nov. 28, 2024 (KR) ........................ 10-2024-0173702

(51) Int. Cl.
*G09G 3/32* (2016.01)

(52) U.S. Cl.
CPC ....... *G09G 3/32* (2013.01); *G09G 2300/0857* (2013.01); *G09G 2310/08* (2013.01); *G09G 2320/0233* (2013.01)

(58) Field of Classification Search
CPC ............. G09G 3/32; G09G 2300/0857; G09G 2310/08; G09G 2320/0233
USPC .......................................................... 345/55
See application file for complete search history.

(56) References Cited

U.S. PATENT DOCUMENTS 4,658,395 A * 4/1987 Blackburn ................ H04J 1/16 370/243
2003/0154434 A1* 8/2003 Hou ....................... G11C 29/44 714/734
2022/0059015 A1* 2/2022 Su ........................ G09G 3/2096
2022/0198989 A1 6/2022 Park et al.
2022/0254301 A1* 8/2022 Park ..................... G09G 3/3233
2023/0023470 A1* 1/2023 Lee .......................... G09G 3/32
2023/0177986 A1* 6/2023 Lee ....................... G06F 3/1446 345/55
2023/0209934 A1* 6/2023 Kim ..................... G09G 3/2096 345/204

FOREIGN PATENT DOCUMENTS

KR 10-1749142 B1 6/2017
KR 10-2022-0087752 A 6/2022

* cited by examiner

*Primary Examiner* — Nathan P Brittingham
(74) *Attorney, Agent, or Firm* — Birch, Stewart, Kolasch & Birch, LLP

(57) ABSTRACT

A display device can detect a line defect using a driver disposed in a display area. The display device can include a display panel including a plurality of main drivers disposed in each of a plurality of unit driving areas, and a timing controller providing a synchronization signal and a clock signal to each of the plurality of main drivers through at least one first signal line. The timing controller is configured to receive, through a second signal line, a test output signal based on a test output pulse output at different timings from at least two main drivers among the plurality of main drivers.

16 Claims, 17 Drawing Sheets

DISPLAY DEVICE COMPRISING A TIMING CONTROLLER THAT RECEIVES A TEST OUTPUT SIGNAL

CROSS-REFERENCE TO RELATED APPLICATION

This application claims priority to Korean Patent Application No. 10-2024-0173702, filed on in the Republic of Korea on Nov. 28, 2024, which is hereby expressly incorporated by reference for all purposes as if fully set forth herein.

BACKGROUND

Technical Field

Embodiments of the present disclosure relate to a display device.

Discussion of the Related Art

A display device is applied to various electronic devices such as televisions, mobile phones, laptops, and tablets. Display devices can include an organic light emitting display (OLED) device that emit light on their own, and a liquid crystal display (LCD) device that require a separate light source.

Recently, display devices with light emitting diodes (LED) are attracting attention as next-generation display devices. Since light emitting diodes are made of inorganic materials rather than organic materials, a display device with the light emitting diode has a characteristics of a faster lighting speed, superior light emitting efficiency, and can display high-luminance images compared to a liquid crystal display or an organic light emitting display.

SUMMARY OF THE DISCLOSURE

Embodiments of the present disclosure can provide a display device capable of detecting line defects due to bending cracks by using a driver disposed in a display area.

Embodiments of the present disclosure can provide a display device capable of effectively driving a plurality of light emitting devices using a driver disposed in a display area.

Embodiments of the present disclosure can provide a display device capable of enabling process optimization by detecting and repairing line defects using existing lines without separate wiring or pads.

Embodiments of the present disclosure can provide a display device capable of easily detecting a defect in a signal line and a defect position by delaying a test pulse at different timings, thereby significantly reducing the time and cost used or needed for defect analysis.

Embodiments of the present disclosure can provide a display device including a display panel including a plurality of main drivers disposed in each of a plurality of unit driving areas, and a timing controller providing a synchronization signal and a clock signal to each of the plurality of main drivers through at least one first signal line. The timing controller can receive, through a second signal line, a test output signal based on a test output pulse output at different timings from at least two main drivers among the plurality of main drivers.

Embodiments of the present disclosure can provide a display device including a plurality of main drivers disposed in each of a plurality of unit driving areas and including a clock buffer for delaying a test pulse provided through at least one first signal line, and a plurality of sub-drivers disposed in each of the plurality of unit driving areas and electrically connected to a corresponding main driver among the plurality of main drivers.

According to embodiments of the present disclosure, it is possible to provide a display device capable of detecting line defects due to bending cracks by using a driver disposed in a display area.

According to embodiments of the present disclosure, it is possible to provide a display device capable of effectively driving a plurality of light emitting devices using a driver disposed in a display area.

According to embodiments of the present disclosure, it is possible to provide a display device capable of enabling process optimization by detecting and repairing line defects using existing lines without separate wiring or pads.

According to embodiments of the present disclosure, it is possible to provide a display device capable of easily detecting a defect in a signal line and a defect position by delaying a test pulse at different timings, thereby significantly reducing the time and cost used or needed for defect analysis.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
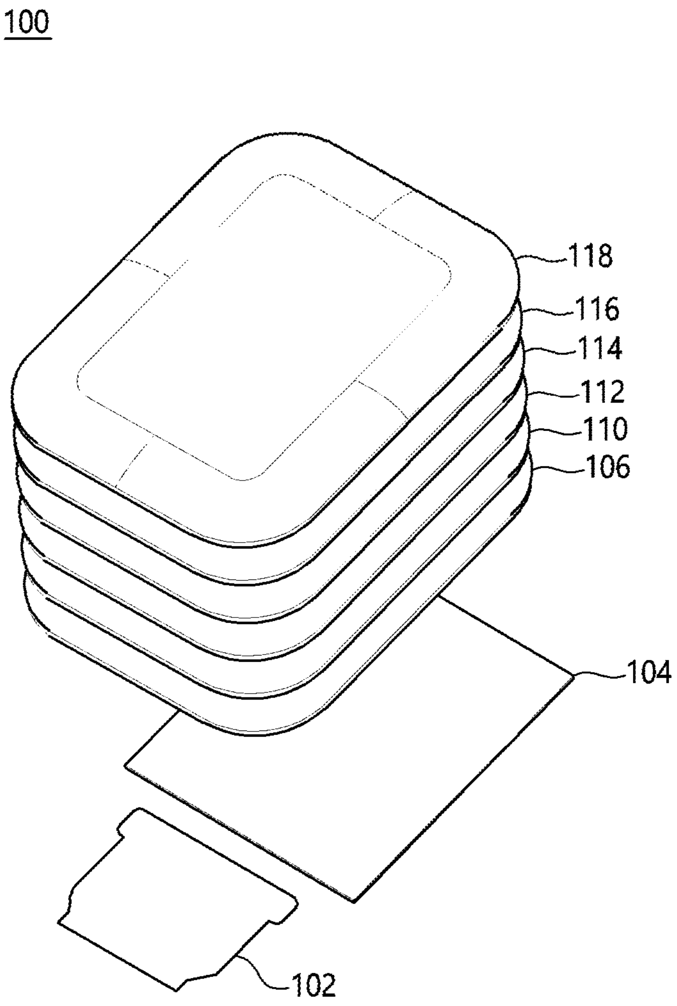
FIGS. 1 and 2 illustrate a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)," etc., can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "may" and vice versa.

Hereinafter, various embodiments of the disclosure are described in detail with reference to the accompanying drawings. All the components of each display device/apparatus according to all embodiments of the present disclosure are operatively coupled and configured.

Figure 2:
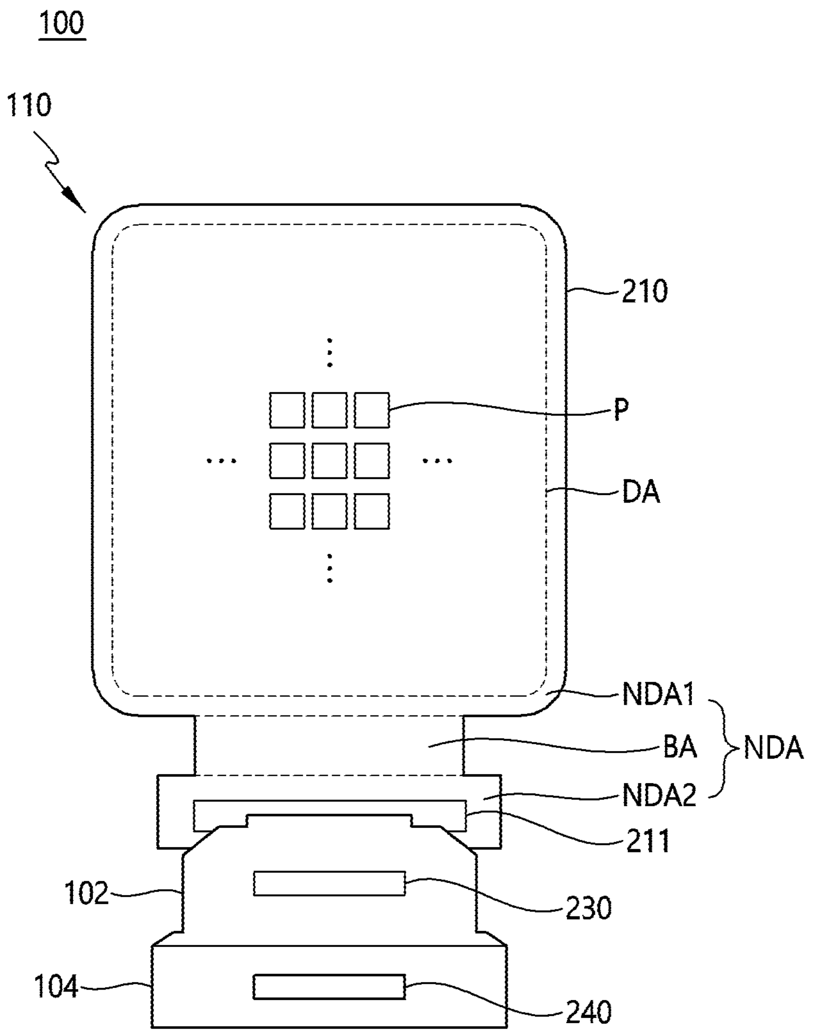

FIGS. 1 and 2 illustrate a display device 100 according to embodiments of the present disclosure.

Specifically, FIG. 1 illustrates a schematic configuration of a display device 100 according to embodiments of the present disclosure, and FIG. 2 illustrates a plan view of a display device 100 according to embodiments of the present disclosure.

Referring to FIG. 1, a display device 100 according to the embodiments of the present disclosure can include a display panel 110, a cover member 118 disposed on the display panel 110, a flexible printed circuit 102 connected to the display panel 110, and a printed circuit board 104 connected to the flexible printed circuit 102.

The display device 100 according to the embodiments of the present disclosure can further include a support substrate 106 disposed under the display panel 110 and supporting the lower portion of the display panel 110, a polarizing layer 114 disposed on the display panel 110, a first adhesive layer 112 disposed between the display panel 110 and the polarizing layer 114, and a second adhesive layer 116 disposed between the polarizing layer 114 and the cover member 118.

The display panel 110 can include a substrate 210. The substrate 210 can be a member on which various components such as a plurality of metal layers and a plurality of insulating material layers are formed. The substrate 210 can be made of an insulating material. For example, the substrate 210 can be made of glass or resin. In addition, the substrate 210 can be made of a flexible material. For example, the substrate 210 can be made of a flexible plastic material such as polyimide (PI). However, the embodiments of the present disclosure are not limited thereto.

The display panel 110 can display information, images, and/or images provided to a user. For example, the display panel 110 can include a display area DA and a non-display area NDA. For example, the substrate 210 can include a display area DA and a non-display area NDA. The display area DA and the non-display area NDA are not limited to the substrate 210, but can be described throughout the entire display device 100.

The display area DA can be an area where an image is displayed. The display area DA can include a plurality of pixels P. Each of the plurality of pixels P can be composed of a plurality of sub-pixels. At least one light emitting device can be arranged in each of the plurality of sub-pixels. The light emitting device can be configured differently depending on the type of the display device 100. For example, if the display device 100 is an inorganic light emitting display device, the light emitting device can be an inorganic-based light emitting device, such as a light emitting diode (LED), a micro LED, or a mini LED, but the embodiments of the present disclosure are not limited thereto.

The non-display area NDA can be an area where an image is not displayed. In the non-display area NDA, various wirings, and circuits for driving a plurality of pixels P of the display area DA can be arranged. For example, various driving circuits and various wirings can be arranged in the non-display area NDA, and a pad section 211 to which an integrated circuit and a printed circuit are connected can be arranged, but the embodiments of the present disclosure are not limited thereto.

For example, the driving circuit can include a data driving circuit and/or a gate driving circuit, but the embodiments of the present disclosure are not limited thereto. Wires or lines supplied with a control signal for controlling the driving circuit can be arranged on the substrate 210. For example, the control signal can include various timing signals including a clock signal, an input data enable signal, and synchronization signals, but the embodiments of the present disclosure are not limited thereto. The control signal can be supplied to the substrate 210 from the outside of the substrate 210 through the pad section 211. For example, circuit components such as a flexible printed circuit 102 and a printed circuit board 104 can be connected to the pad section 211.

According to the present embodiments, the non-display area NDA can include a first non-display area NDA1, a bending area BA, and a second non-display area NDA2. For example, the first non-display area NDA1 can be an area surrounding at least a portion of the display area DA. The bending area BA can be an area extending from at least one of a plurality of sides of the first non-display area NDA1 and can be a bendable area. The second non-display area NDA2 can be an area extending from the bending area BA and can include a pad section 211. For example, the bending area BA can be in a bent state, and the remaining area of the substrate 210 excluding the bending area BA can be in a flat state. In this case, as the bending area BA is bent, the second non-display area NDA2 can be located on the back surface of the display area DA. However, the embodiments of the present disclosure are not limited thereto.

The display area DA of the substrate 210 or the display device 100 can be configured in various shapes according to the design of the display device 100. For example, the display area DA can be configured in a rectangular shape with four corners formed in a round shape, but the embodiments of the present disclosure are not limited thereto. For another example, the display area DA can be configured in a rectangular shape with four corners formed in a right angle shape, or configured in a circular shape, but the embodiments of the present disclosure are not limited thereto.

According to the embodiments of the present disclosure, a width of the second non-display area NDA2 where the pad section 211 is arranged can be wider than a width of the bending area BA. In addition, a width of the display area DA can be wider than the width of the bending area BA. In the drawing, the width of the bending area BA is depicted as being narrower than the width of other areas of the substrate 210, but the shape of the substrate 210 including the bending area BA is an example, and the embodiments of the present disclosure are not limited thereto.

Referring to FIG. 1 and FIG. 2, a flexible printed circuit 102 and a printed circuit board 104 can be disposed at a lower portion of the display panel 110. The flexible printed circuit 102 and the printed circuit board 104 can be arranged at one edge of the display panel 100, but the embodiments of the present disclosure are not limited thereto. One side of the flexible printed circuit 102 can be connected to the display panel 110, and the other side can be connected to the printed circuit board 104, but the embodiments of the present disclosure are not limited thereto. The flexible printed circuit 102 can be a flexible film, but the embodiments of the present disclosure are not limited thereto.

The pad section 211 disposed in the second non-display area NDA2 includes a plurality of pads, and a driving component including one or more flexible printed circuits 102 and a printed circuit board 104 can be attached or bonded. The plurality of pads included in the pad section 211 are electrically connected to one or more flexible printed circuits 102, and can transmit various signals (or power) from the printed circuit board 104 and one or more flexible printed circuits 102 to a driving circuit (for example, a driver DRV of FIG. 3) arranged in the display area DA.

The flexible printed circuit 102 can be a film in which various components are arranged on a flexible base film. For example, a first circuit component 230, such as a gate drive integrated circuit and/or a data drive integrated circuit, can be arranged on one or more flexible printed circuits 102, but the embodiments of the present disclosure are not limited thereto. The first circuit component 230 can be a component that processes data and a driving signal for displaying an image. The first circuit component 230 can be arranged in a manner such as a chip-on-glass (COG), a chip-on-film (COF), or a tape carrier package (TCP) depending on the mounting method, but the embodiments of the present disclosure are not limited thereto. The flexible printed circuit 102 can be attached or bonded to a plurality of pads through a conductive adhesive layer, but the embodiments of the present disclosure are not limited thereto.

The printed circuit board 104 can be a component that is electrically connected to the flexible printed circuit 102 and supplies a signal to the first circuit component 230. The printed circuit board 104 can be arranged on one side of the flexible printed circuit 102 and can be electrically connected to the flexible printed circuit 102. Various components for supplying various signals to the first circuit component 230 can be arranged on the printed circuit board 104. For example, various second circuit components 240, such as a timing controller, a power supply, a memory, or a processor, can be arranged on the printed circuit board 104. For example, the second circuit components 240 arranged on the printed circuit board 104 can include a timing controller and/or a power management integrated circuit (PMIC), but the embodiments of the present disclosure are not limited thereto.

The printed circuit board 104 can include at least one hole, but the embodiments of the present disclosure are not limited thereto. An internal component detecting ambient light or temperature, such as a plurality of sensors, can be arranged in an area corresponding to at least one hole. For example, the internal component can include an ambient light sensor (ALS) or a temperature sensor, but the embodiments of the present disclosure are not limited thereto. For example, the hole can be a transmission hole, but the embodiments of the present disclosure are not limited thereto.

Referring to FIG. 1, a polarizing layer 114 can be arranged on a display panel 110 and can prevent or reduce light generated from an external light source from entering the display panel 110 and affecting a light emitting device.

A cover member 118 can be arranged on a polarizing layer 114 and can be a member for protecting the display panel 110.

A second adhesive layer 116 can be disposed between the polarizing layer 114 and the cover member 118. The second adhesive layer 116 can attach the cover member 118 to the display panel 110 or the polarizing layer 114.

A first adhesive layer 112 can be disposed between the display panel 110 and the polarizing layer 114. The first adhesive layer 112 can attach the polarizing layer 114 to the display panel 110. The first adhesive layer 112 can be omitted.

Each of the first adhesive layer 112 and the second adhesive layer 116 can include an optically clear adhesive (OCA), an optically clear resin (OCR), or a pressure sensitive adhesive (PSA), but the embodiments of the present disclosure are not limited thereto.

The support substrate 106 is disposed between the display panel 110 and the printed circuit board 104 to reinforce the rigidity of the display panel 110. The support substrate 106 can be a back plate, but the embodiments of the present disclosure are not limited thereto.

Figure 3:
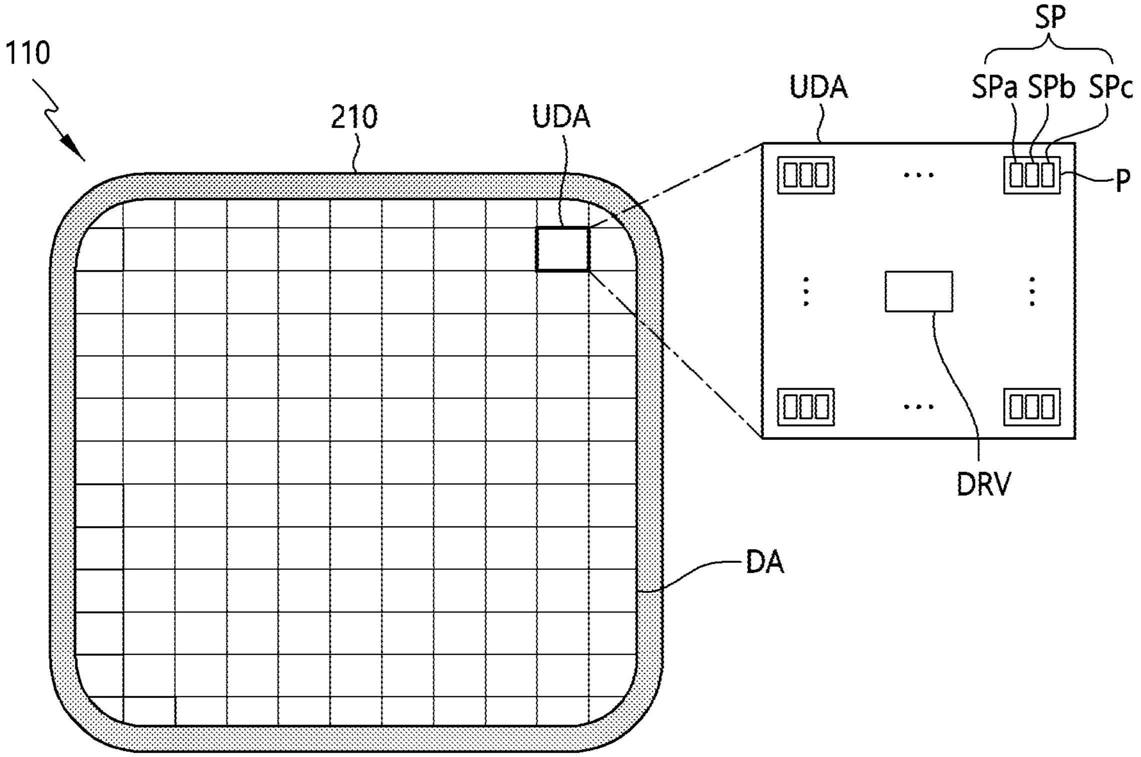
FIG. 3 illustrates a display panel according to embodiments of the present disclosure.
Figure 4:
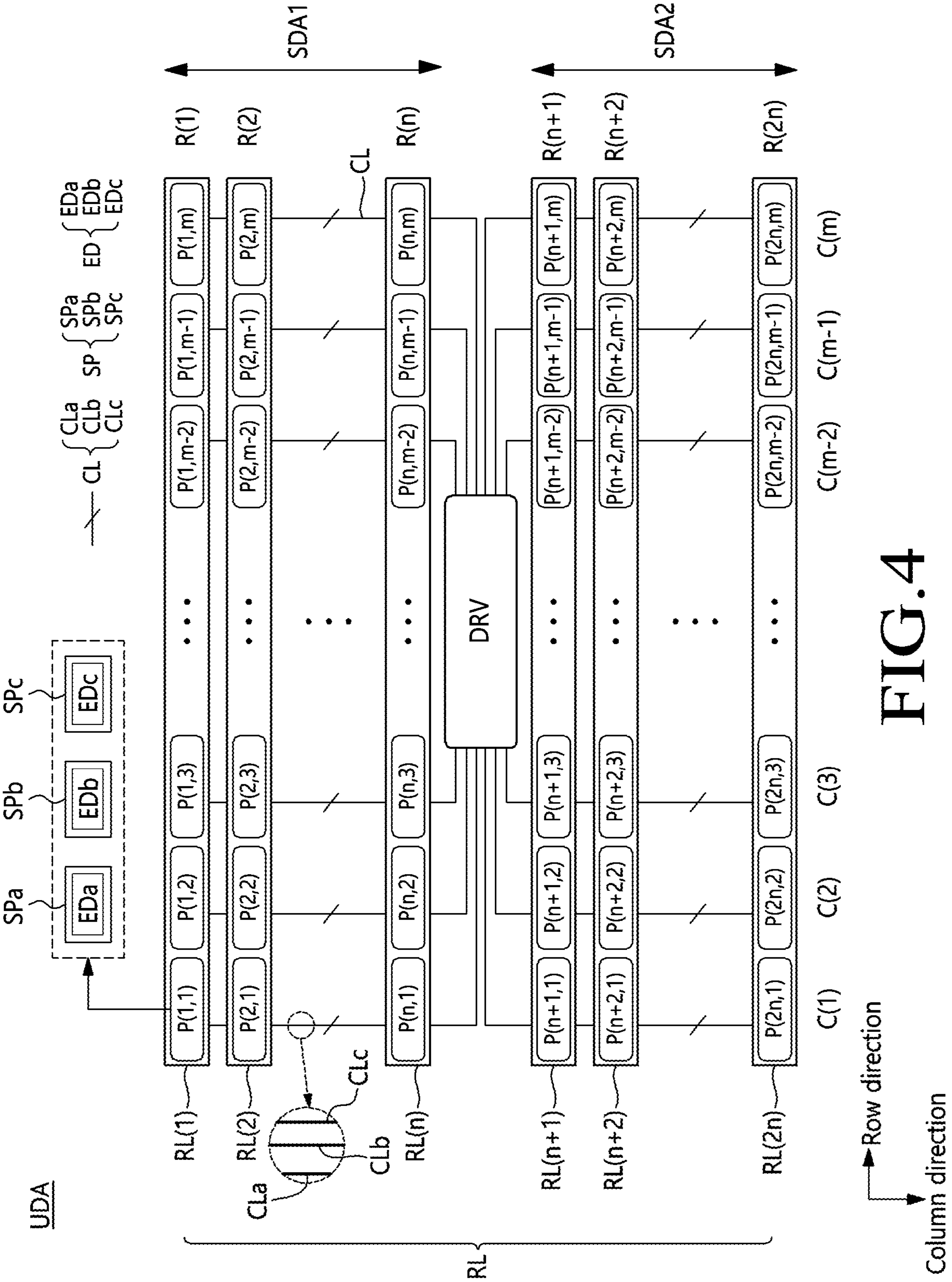
FIG. 4 illustrates a unit driving area of a display panel according to embodiments of the present disclosure.

FIG. 3 illustrates a display panel 110 according to embodiments of the present disclosure, and FIG. 4 illustrates a unit driving area UDA of a display panel 110 according to embodiments of the present disclosure.

Referring to FIG. 3, the display area DA of the display panel 110 according to the embodiments of the present disclosure can include a plurality of unit driving areas UDA.

The display panel 110 according to the embodiments of the present disclosure can include a driver DRV arranged in each of the plurality of unit driving areas UDA. For example, the driver DRV can be a driving chip manufactured using a MOSFET (Metal-oxide-silicon field effect transistor) manufacturing process on a semiconductor substrate, but the embodiments of the present disclosure are not limited thereto.

Each of the plurality of unit driving areas UDA can be a driving area driven by one driver DRV. For example, the plurality of unit driving areas UDA can be independent driving areas driven by different drivers DRV.

The driver DRV can include at least one main driver connected to a timing controller through a signal line, and a plurality of sub-drivers electrically connected to the at least one main driver.

Each of the plurality of sub-drivers can be electrically connected to at least one of the plurality of pixels P.

The display panel 110 according to the embodiments of the present disclosure can include a substrate 210 including a display area DA, and a plurality of pixels P arranged in a matrix form in the display area DA.

A plurality of pixels P can be arranged in each of the plurality of unit driving areas UDA. Each of the plurality of pixels P can include a plurality of sub-pixels SP. Each of the plurality of sub-pixels SP can include at least one light emitting device.

For example, the plurality of sub-pixels SP can include a first sub-pixel SPa, a second sub-pixel SPb, and a third sub-pixel SPc, but is not limited thereto. The first sub-pixel SPa can include a first light emitting device that emits a first color light, the second sub-pixel SPb can include a second light emitting device that emits a second color light, and the third sub-pixel SPc can include a third light emitting device that emits a third color light. For example, the first color light, the second color light, and the third color light can be red light, green light, and blue light, respectively, but are not limited thereto.

Referring to FIG. 4, the display panel 110 according to the embodiments of the present disclosure can include a plurality of light emitting devices ED. Each of the plurality of sub-pixels SP can include a light emitting device ED.

For example, the first sub-pixel SPa can include a first light emitting device EDa, the second sub-pixel SPb can include a second light emitting device EDb, and the third sub-pixel SPc can include a third light emitting device EDc.

The display panel 110 according to the embodiments of the present disclosure can include a plurality of row lines RL and a plurality of column lines CL.

Each of the plurality of row lines RL can be arranged to extend in a row direction. The plurality of row lines RL can be electrically connected to a first electrode of each of a plurality of light emitting devices ED.

Each of the plurality of column lines CL can be arranged to extend in a column direction. The plurality of column lines CL can be electrically connected to a second electrode of each of the plurality of light emitting device ED.

For example, the first electrode of each of the plurality of light emitting device ED can be an anode electrode, and the second electrode of each of the plurality of light emitting device ED can be a cathode electrode. For another example, the first electrode of each of the plurality of light emitting device ED can be a cathode electrode, and the second electrode of each of the plurality of light emitting device ED can be an anode electrode.

Each of the plurality of row lines RL can be electrically connected to the second electrode of each of the plurality of light emitting device ED. For example, the second electrodes of each of the plurality of light emitting device ED can be commonly connected to one row line RL.

Each of the plurality of column lines CL can be electrically connected to the first electrode of each of the plurality of light emitting device ED. For example, the first electrode of each of the plurality of light emitting device ED can be commonly connected to one column line CL.

The line width of each of the plurality of row lines RL can be greater than the line width of each of the plurality of column lines CL.

The display panel 110 according to the embodiments of the present disclosure can include a plurality of drivers DRV. The plurality of drivers DRV can drive the plurality of light emitting device ED, the plurality of column lines CL, and the plurality of row lines RL.

The plurality of drivers DRV can be built into the display panel 110. The plurality of drivers DRV can be arranged in the display area DA, and can be arranged on the substrate 210. The plurality of drivers DRV can be arranged to correspond to a plurality of unit driving areas UDA. For example, one driver DRV can be arranged in one unit driving area UDA.

Each of the plurality of drivers DRV can drive a plurality of row lines RL and a plurality of column lines CL arranged in a corresponding unit driving area UDA among the plurality of unit driving areas UDA, thereby emitting light from a plurality of light emitting device ED arranged in the corresponding unit driving area UDA.

The plurality of drivers DRV are disposed in the display area DA, and can be positioned closer to the substrate 210 than the plurality of light emitting device ED.

For example, the plurality of row lines RL can be driven sequentially. For another example, the plurality of row lines RL can be driven simultaneously. For another example, two or more row lines RL among the plurality of row lines RL can be driven simultaneously.

For example, during a specific display driving period, among the plurality of row lines RL arranged in the unit driving area UDA, at least one row line RL can be driven, and the remaining row lines RL may not be driven.

According to the embodiments of the present disclosure, a voltage applied to the row line RL can be referred to as a low-potential voltage, and the low-potential voltage can also be referred to as a row line voltage or a cathode voltage. The low-potential voltage can have various voltage values depending on the driving type or driving state. For example, the low-potential voltage can include a first low-potential voltage, a second low-potential voltage, and a third low-potential voltage.

Driving the row line RL can mean that the first low-potential voltage is supplied to the row line RL. Not driving the row line RL can mean that the second low-potential voltage higher than the first low-potential voltage is supplied to the row line RL. Accordingly, the light emitting device ED overlapping with the driven row line RL can emit light, and the light emitting device ED overlapping with the non-driven row line RL may not emit light.

For example, any first row line RL among the plurality of row lines RL can be supplied with a first low-potential voltage during a first period, and can be supplied with a second low-potential voltage higher than the first low-potential voltage during a second period different from the first period. Accordingly, the light emitting devices ED overlapping with the first row line RL can emit light during the first period, and may not emit light during the second period different from the first period. For example, the first period and the second period can be included in one display driving period. For another example, the first period and the second period can be included in different display driving periods.

Figure 5:
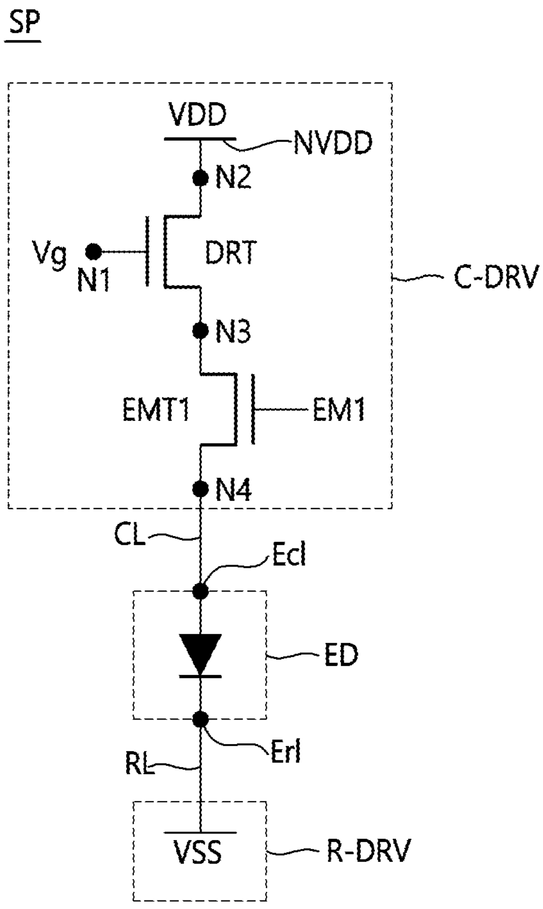
FIG. 5 illustrates a sub-pixel of a display panel according to embodiments of the present disclosure.

FIG. 5 illustrates a sub-pixel SP of a display panel 110 according to embodiments of the present disclosure.

Referring to FIG. 5, the sub-pixel SP according to embodiments of the present disclosure can include a light emitting device ED including a first electrode Ecl and a second electrode Erl, a column driver C-DRV for driving a column line CL electrically connected to the first electrode Ecl of the light emitting device ED, and a row driver R-DRV for driving a row line RL electrically connected to the second electrode Erl of the light emitting device ED.

The light emitting device ED can include a first electrode Ecl and a second electrode Erl. The first electrode Ecl can be electrically connected to a column line CL, and the second electrode Erl can be electrically connected to a row line RL. For example, the first electrode Ecl can be an anode electrode, and the second electrode Erl can be a cathode electrode. For another example, the first electrode Ecl can be a cathode electrode, and the second electrode Erl can be an anode electrode.

A column driver C-DRV included in a unit driving area UDA can be connected to a plurality of column lines CL included in the unit driving area UDA, and can drive a plurality of column lines CL included in the unit driving area UDA. Each of the plurality of column lines CL can be commonly connected to the first electrode Ecl of each of the plurality of light emitting devices ED included in the plurality of sub-pixels SP arranged in the corresponding column.

A row driver R-DRV included in a unit driving area UDA can be connected to a plurality of row lines RL included in the unit driving area UDA and can drive a plurality of row lines RL included in the unit driving area UDA. Each of the plurality of row lines RL can be commonly connected to a second electrode Erl of each of a plurality of light emitting devices ED included in a plurality of sub-pixels SP arranged in the corresponding row.

The column driver C-DRV can include main nodes including a first node N1, a second node N2, a third node N3, and a fourth node N4. The column driver C-DRV can include a driving transistor DRT and a first emission control transistor EMT1.

The first node N1 can be a node to which a voltage Vg for controlling the on-off of the driving transistor DRT is applied. The second node N2 can be a node electrically connected to a high-potential voltage node NVDD to which a high-potential voltage VDD is applied. The third node N3 can be a node to which the driving transistor DRT and the first emission control transistor EMT1 are connected. The fourth node N4 can be a node to which the first emission control transistor EMT1 and the light emitting device ED are electrically connected, and can be a node to which the column line CL is electrically connected. Here, a source electrode or a drain electrode of the first emission control transistor EMT1 and the first electrode Ecl of the light emitting device ED can be commonly connected to the column line CL.

The driving transistor DRT supplies a driving current to make the light emitting device ED emit light, is connected between the second node N2 and the third node N3, and can control the connection between the second node N2 and the third node N3 according to the voltage of the first node N1.

The gate electrode of the driving transistor DRT is electrically connected to the first node N1, and a gate voltage Vg can be applied thereto. The drain electrode or the source electrode of the driving transistor DRT can be electrically connected to the second node N2. The source electrode or the drain electrode of the driving transistor DRT can be electrically connected to the third node N3.

The first emission control transistor EMT1 can control a connection of a path through which the driving current flows, and can play a role in controlling an emission of the light emitting device ED.

If the driving transistor DRT and the first emission control transistor EMT1 are turned on between a high potential voltage VDD and a low potential voltage VSS, the driving current can be supplied to the light emitting device ED through the driving transistor DRT and the first emission control transistor EMT1. Accordingly, the light emitting device ED can emit light.

The first emission control transistor EMT1 is connected between the third node N3 and the fourth node N4, and can control the connection between the third node N3 and the fourth node N4 according to a first emission control signal EM1. The first emission control signal EM1 can be applied to the gate electrode of the first emission control transistor EMT1. The drain electrode or the source electrode of the first emission control transistor EMT1 can be electrically connected to the third node N3. The source electrode or drain electrode of the first emission control transistor EMT1 can be electrically connected to the fourth node N4.

The first emission control signal EM1 can be a pulse width modulation signal that varies at a predefined time (for example, each frame, or each sub-frame included in one frame), but the embodiments of the present disclosure are not limited thereto.

The first emission control signal EM1 can be generated by the driver DRV, or can be supplied to the driver DRV from a driving-related circuit such as a timing controller.

The row driver R-DRV can drive at least one row line RL by supplying a low-potential voltage VSS to at least one row line RL.

The row driver R-DRV can perform display-on driving or display-off driving for one row line RL.

The row driver R-DRV can supply a low-potential voltage for display-on driving to one row line RL in order to perform display-on driving for one row line RL. The row driver R-DRV can supply a low-potential voltage for display-off driving to one row line RL in order to perform display-off driving for one row line RL.

A low-potential voltage for display-on driving and a low-potential voltage for display-off driving can be different. For example, the low-potential voltage for display-on driving can be lower than the low-potential voltage for display-off driving. In the embodiments of the present disclosure, the "low-potential voltage for display-on driving" is also referred to as the "first low-potential voltage," and the "low-potential voltage for display-off driving" is also referred to as the "second low-potential voltage."

The column driver C-DRV can further include at least one switching element and/or at least one transistor in addition to the driving transistor DRT and the first emission control transistor EMT1. Each of the transistors included in the column driver C-DRV can be an n-type transistor or a p-type transistor.

The column driver C-DRV can further include at least one capacitor.

The column driver C-DRV can further include at least one circuit element. For example, the at least one circuit element can include a power output buffer.

The row driver R-DRV can include at least one switching element and/or at least one transistor. Each of the transistors included in the row driver R-DRV can be an n-type transistor or a p-type transistor.

The row driver R-DRV can further include at least one circuit element. For example, at least one circuit element can include a power output buffer.

The column driver C-DRV and the row driver R-DRV can be internal circuits included in the driver DRV. As another example, the column driver C-DRV and the row driver R-DRV may not be included in the driver DRV and can be circuits formed on the substrate 210 of the display panel 110.

Figure 6:
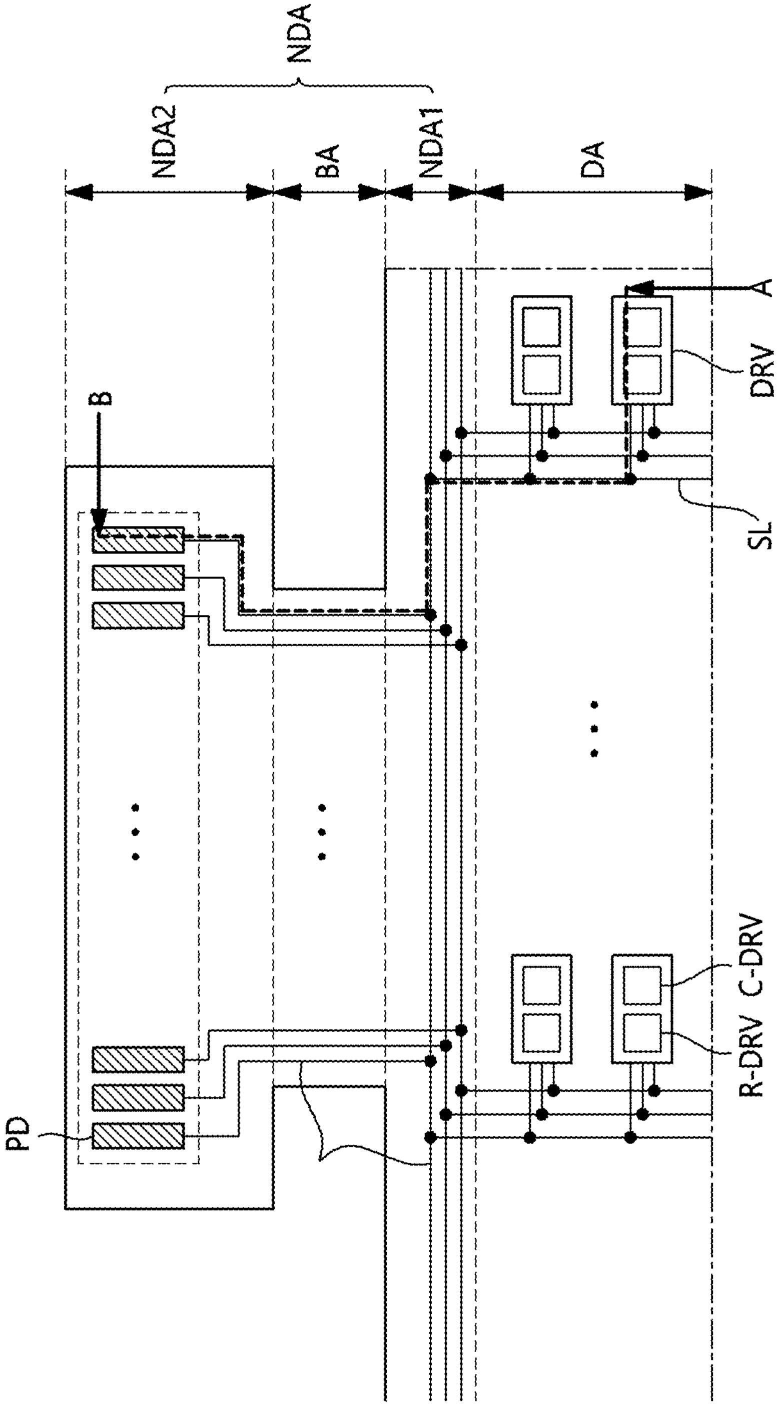
FIGS. 6 to 8 are diagrams for further explanation of a display panel according to embodiments of the present disclosure.
Figure 7:
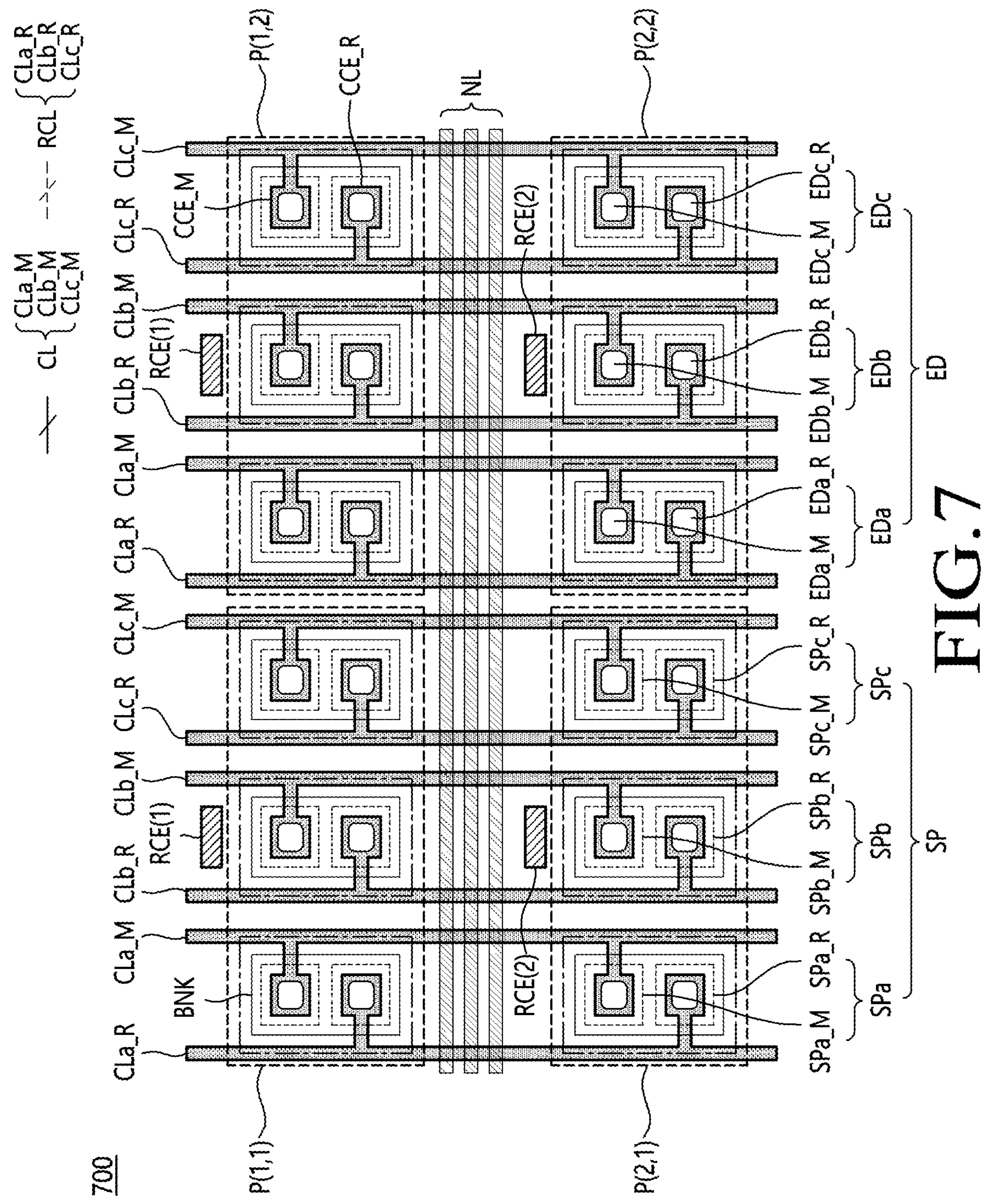
Figure 8:
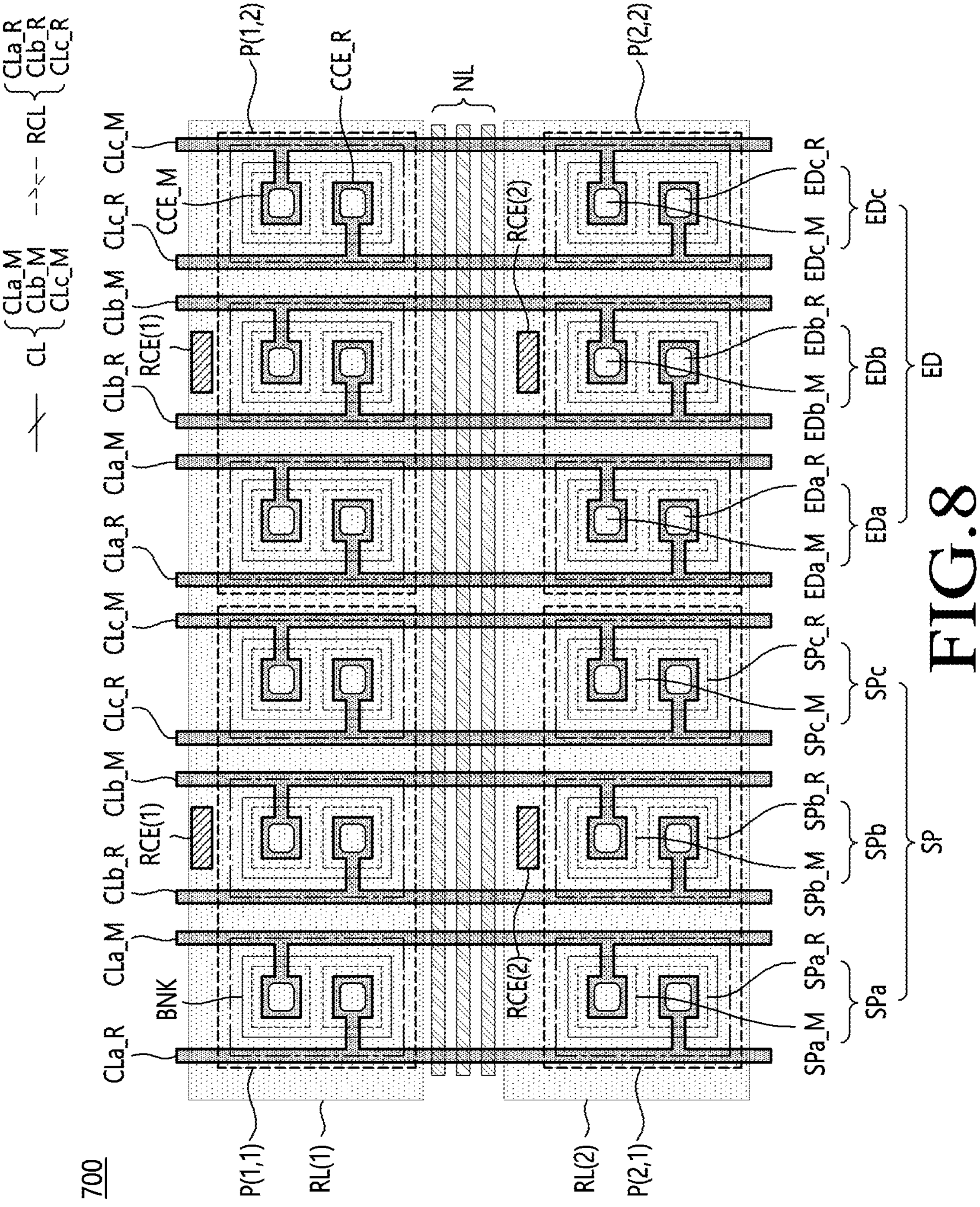

FIGS. 6 to 8 are diagrams for further explanation of a display panel 110 according to embodiments of the present disclosure.

Specifically, FIG. 6 is a plan view of a display panel 110 according to embodiments of the present disclosure, and FIG. 7 and FIG. 8 are plan views of a portion (i.e., two-row, two-column area) 700 of a display panel 110 according to embodiments of the present disclosure.

More specifically, FIG. 7 is a plan view that does not represent two row lines RL(1) and RL(2) arranged in a two-row, two-column area 700, and FIG. 8 is a plan view that adds two row lines RL(1) and RL(2) arranged in a portion 700 of a display panel 110.

Referring to FIG. 6, the substrate 210 of the display panel 110 according to the embodiments of the present disclosure can include a display area DA and a non-display area NDA, and the non-display area NDA can include a first non-display area NDA1, a bending area BA, and a second non-display area NDA2.

A plurality of drivers DRV can be arranged in the display area DA. Each of the plurality of drivers DRV can be a circuit for driving light emitting devices of a plurality of sub-pixels included in a corresponding unit driving area UDA. Each of the plurality of drivers DRV can include a row driver R-DRV for driving a plurality of row lines and a column driver C-DRV for driving a plurality of column lines, in order to drive a plurality of light emitting devices ED included in a corresponding unit driving area UDA.

A pad section 211 including a plurality of pads PD can be arranged in the second non-display area NDA2.

A plurality of signal lines SL and a plurality of link lines LL for signal transmission between a plurality of drivers DRV arranged in the display area DA and the pad section 211 can be arranged on the substrate 210. The plurality of signal lines SL can be electrically connected between the plurality of link lines LL and the plurality of drivers DRV. The plurality of link lines LL can electrically connect the plurality of pads PD and the plurality of signal lines SL.

The plurality of link lines LL can be arranged in the non-display area NDA, and all or part of each of the plurality of signal lines SL can be arranged in the display area DA.

Each of the plurality of drivers DRV can receive various signals to perform a driving operation through the plurality of link lines LL and the plurality of signal lines SL. Here, the various signals can include various power voltages and various signals needed for the driving operation of each of the plurality of drivers DRV.

As the bending area BA is bent, a portion of the plurality of link lines LL can also be bent. Stress can be concentrated on a portion of the bent link line LL, and thus cracks can occur in the link line LL. Accordingly, the plurality of link lines LL can be formed of a conductive material having excellent ductility to reduce cracks when the bending area BA is bent. For example, the plurality of link lines LL can be formed of a conductive material having excellent ductility, such as gold (Au), silver (Ag), aluminum (Al), but the embodiments of the present disclosure are not limited thereto. In addition, the plurality of link lines LL can be composed of one of various conductive materials used in the display area DA. For example, the plurality of link lines LL can be composed of molybdenum (Mo), chromium (Cr), titanium (Ti), nickel (Ni), neodymium (Nd), copper (Cu), and an alloy of silver (Ag) and magnesium (Mg), or an alloy thereof, but the embodiments of the present disclosure are not limited thereto. The plurality of link lines LL can be composed of a multilayer structure including various conductive materials. For example, the plurality of link lines LL can be composed of a triple layer structure of titanium (Ti)/aluminum (Al)/titanium (Ti), but the embodiments of the present disclosure are not limited thereto.

The plurality of link lines LL can be composed of various shapes to reduce stress. At least a portion of the plurality of link lines LL arranged on the bending area BA can extend in the same direction as the extension direction of the bending area BA, or can extend in a direction different from the extension direction of the bending area BA to reduce stress. For example, if the bending area BA extends in one direction from the first non-display area NDA1 toward the second non-display area NDA2, at least a portion of the plurality of link lines LL arranged on the bending area BA can extend in a direction oblique to the one direction. As another example, at least a portion of the plurality of link lines LL can be configured as patterns of various shapes. For example, at least a portion of the plurality of link lines LL arranged on the bending area BA can be a shape in which conductive patterns having at least one shape among a diamond shape, a rhombus shape, a trapezoidal wave shape, a triangular wave shape, a sawtooth wave shape, a sine wave shape, a circular shape, and an omega (Ω) shape are repeatedly arranged, but the embodiments of the present disclosure are not limited thereto. Therefore, in order to minimize the stress concentrated on the plurality of link lines LL and the resulting cracks, the shapes of the plurality of link lines LL can be formed in various shapes including the shapes described above, but the embodiments of the present disclosure are not limited thereto.

Referring to FIG. 7 and FIG. 8, in the two-row, two-column area 700, four pixels P(1,1), P(1,2), P(2,1), P(2,2) can be arranged in two rows and two columns. For example, in the two-row, two-column area 700, two pixels P(1,1) and P(1,2) can be arranged in a first row (e.g., a first pixel row), and two pixels P(2,1) and P(2,2) can be arranged in a second row (e.g., a second pixel row). In addition, two pixels P(1,1) and P(2,1) can be arranged in a first column (e.g., a first pixel column), and two pixels P(1,2) and P(2,2) can be arranged in a second column (e.g., a second pixel column).

In the two-row, two-column area 700, each of the four pixels P(1,1), P(1,2), P(2,1) and P(2,2) arranged in two rows and two columns can include k sub-pixels. Here, k is the number of sub-pixels included in one pixel.

In FIG. 7 and FIG. 8, it is exemplified a case where k is 3 is as an example. Accordingly, in the two-row, two-column area 700, each of the four pixels P(1,1), P(1,2), P(2,1) and P(2,2)) arranged in two rows and two columns can include three sub-pixels SPa, SPb and SPc. In the following description, it can be explained assuming the case where k is 3.

The three sub-pixels can include a first sub-pixel SPa including a first light emitting device EDa that emits a first color light, a second sub-pixel SPb including a second light emitting device EDb that emits a second color light, and a third sub-pixel SPc including a third light emitting device EDc that emits a third color light.

If the display panel 110 according to the embodiments of the present disclosure has a redundancy structure, the sub-pixel redundancy structure is as follows.

The first sub-pixel SPa can include a first main sub-pixel SPa_M including a first main light emitting device EDa_M and a first redundancy sub-pixel SPa_R including a first redundancy light emitting device EDa_R, the second sub-pixel SPb can include a second main sub-pixel SPb_M including a second main light emitting device EDb_M and a second redundancy sub-pixel SPb_R including a second redundancy light emitting device EDb_R, and the third sub-pixel SPc can include a third main sub-pixel SPc_M including a third main light emitting device EDc_M and a third redundancy sub-pixel SPc_R including a third redundancy light emitting device EDc_R.

If the display panel 110 according to the embodiments of the present disclosure has a redundancy structure, the light emitting device redundancy structure is as follows.

The first light emitting device EDa can include a first main light emitting device EDa_M that emits a first color light and a first redundancy light emitting device EDa_R that emits a first color light, the second light emitting device EDb can include a second main light emitting device EDb_M that emits a second color light and a second redundancy light emitting device EDb_R that emits a second color light, and the third light emitting device EDb can include a third main light emitting device EDc_M that emits a third color light and a third redundancy light emitting device EDc_R that emits a third color light.

Referring to FIG. 7 and FIG. 8, in the two-row, two-column area 700, a first row line RL(1) and a second row line RL(2) can be arranged. The first row line RL(1) can be arranged in the first row (i.e., the first pixel row), and the second row line RL(2) can be arranged in the second row (i.e., the second pixel row).

The first row line RL(1) can correspond to two pixels P(1,1) and P(1,2) arranged in the first row (or the first pixel row), and can correspond to three sub-pixels SPa, SPb and SPc included in each of the two pixels P(1,1) and P(1,2) arranged in the first row (or the first pixel row).

In terms of the sub-pixel redundancy structure, the first row line RL(1) can be connected to the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the first row (or the first pixel row).

At least a portion of the first row line RL(1) can overlap with the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the first row (or the first pixel row).

From the perspective of the light emitting device redundancy structure, the first row line RL(1) can be connected to the second electrode Erl of each of the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the first row (or the first pixel row).

At least a part of the first row line RL(1) can overlap with the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the first row (or the first pixel row).

The second row line RL(2) can correspond to two pixels P(2,1) and P(2,2) arranged in a second row (or the second pixel row), and can correspond to three sub-pixels SPa, SPb and SPc included in each of the two pixels P(2,1) and P(2,2) arranged in the second row (or the second pixel row).

In terms of the sub-pixel redundancy structure, the second row line RL(2) can be connected to the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the second row (or the second pixel row).

At least a portion of the second row line RL(2) can overlap with the first main sub-pixel SPa_M, the first redundancy sub-pixel SPa_R, the second main sub-pixel SPb_M, the second redundancy sub-pixel SPb_R, the third main sub-pixel SPc_M, and the third redundancy sub-pixel SPc_R arranged in the second row (or the second pixel row).

In terms of the light emitting device redundancy structure, the second row line RL(2) can be connected to the second electrode Erl of each of the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the second row (or the second pixel row).

At least a portion of the second row line RL(2) can overlap with the first main light emitting device EDa_M, the first redundancy light emitting device EDa_R, the second main light emitting device EDb_M, the second redundancy light emitting device EDb_R, the third main light emitting device EDc_M, and the third redundancy light emitting device EDc_R arranged in the second row (or the second pixel row).

A plurality of column lines CL can be arranged in the two-row two-column area 700. A plurality of column lines CL arranged in a two-row two-column area 700 can include a plurality of first column lines CL connected to two pixels P(1,1) and P(2,1) arranged in a first column (or a first pixel column), and a plurality of second column lines CL connected to two pixels P(1,2) and P(2,2) arranged in a second column (or a second pixel column).

From the perspective of sub-pixel redundancy, a plurality of first column lines CL arranged in a first column (or first pixel column) can include a first main column line CLa_M that is commonly connected to a first main sub-pixel SPa_M included in each of two pixels P(1,1) and P(2,1) arranged in the first column (or first pixel column), and a first redundancy column line CLa_R that is commonly connected to a first redundancy sub-pixel SPa_R included in each of two pixels P(1,1) and P(2,1) arranged in the first column (or first pixel column).

The first main sub-pixel SPa_M included in each of the two pixels P(1,1) and P(2,1) arranged in the first column (or the first pixel column) can include a first main light emitting device EDa_M, and the first redundancy sub-pixel SPa_R included in each of the two pixels P(1,1) and P(2,1) arranged in the first column (or the first pixel column) can include a first redundancy light emitting device (EDa_R).

The first main column line CLa_M arranged in the first column (or the first pixel column) can be commonly connected to the first electrodes Ecl of the two first main light emitting devices EDa_M arranged in the first column (or the first pixel column).

The first redundancy column line CLa_R arranged in the first column (or the first pixel column) can be commonly connected to the first electrodes Ecl of two first redundancy light emitting devices EDa_R arranged in the first column (or the first pixel column).

In addition, the plurality of first column lines CL arranged in the first column (or the first pixel column) can further include a second main column line CLb_M commonly connected to a second main sub-pixel SPb_M included in each of the two pixels P(1,1) and P(2,1) arranged in the first column (or the first pixel column), and a second redundancy column line CLb_R commonly connected to a second redundancy sub-pixel SPb_R included in each of the two pixels P(1,1) and P(2,1) arranged in the first column (or the first pixel column).

The second main sub-pixel SPb_M included in each of the two pixels P(1,1) and P(2,1) arranged in the first column (or the first pixel column) can include a second main light emitting device EDb_M, and the second redundancy sub-pixel SPb_R included in each of the two pixels P(1,1) and P(2,1) arranged in the first column (or the first pixel column) can include a second redundancy light emitting device EDb_R.

The second main column line CLb_M arranged in the first column (or the first pixel column) can be commonly connected to the first electrodes Ecl of the two second main light emitting devices EDb_M arranged in the first column (or the first pixel column).

The second redundancy column line CLb_R arranged in the first column (or the first pixel column) can be commonly connected to the first electrodes Ecl of the two second redundancy light emitting devices EDb_R arranged in the first column (or the first pixel column).

In addition, the plurality of first column lines CL arranged in the first column (or the first pixel column) can further include a third main column line CLc_M commonly connected to the third main sub-pixel SPc_M included in each of the two pixels P(1,1) and P(2,1) arranged in the first column (or the first pixel column), and a third redundancy column line CLc_R commonly connected to the third redundancy sub-pixel SPc_R included in each of the two pixels P(1,1) and P(2,1) arranged in the first column (or the first pixel column).

The third main sub-pixel SPc_M included in each of the two pixels P(1,1) and P(2,1) arranged in the first column (or the first pixel column) can include a third main light emitting device EDc_M, and the third redundancy sub-pixel SPc_R included in each of the two pixels P(1,1) and P(2,1) arranged in the first column (or the first pixel column) can include a third redundancy light emitting device EDc_R.

The third main column line CLc_M arranged in the first column (or the first pixel column) can be commonly connected to the first electrodes Ecl of the two third main light emitting devices EDc_M arranged in the first column (or the first pixel column).

The third redundancy column line CLc_R arranged in the first column (or the first pixel column) can be commonly connected to the first electrodes Ecl of two third redundancy light emitting devices EDc_R arranged in the first column (or the first pixel column).

From the perspective of sub-pixel redundancy, a plurality of second column lines CL arranged in a second column (or second pixel column) can include a first main column line CLa_M that is commonly connected to a first main sub-pixel SPa_M included in each of two pixels P(1,2) and P(2,2) arranged in the second column (or second pixel column), and a first redundancy column line CLa_R that is commonly connected to a first redundancy sub-pixel SPa_R included in each of two pixels P(1,2) and P(2,2) arranged in the second column (or second pixel column).

The first main sub-pixel SPa_M included in each of the two pixels P(1,2) and P(2,2) arranged in the second column (or the second pixel column) can include a first main light emitting device EDa_M, and the first redundancy sub-pixel SPa_R included in each of the two pixels P(1,2) and P(2,2) arranged in the second column (or the second pixel column) can include a first redundancy light emitting device EDa_R.

The first main column line CLa_M arranged in the second column (or the second pixel column) can be commonly connected to the first electrodes Ecl of the two first main light emitting devices EDa_M arranged in the second column (or the second pixel column).

The first redundancy column line CLa_R arranged in the second column (or the second pixel column) can be commonly connected to the first electrodes Ecl of the two first redundancy light emitting devices EDa_R arranged in the second column (or the second pixel column).

In addition, the plurality of second column lines CL arranged in the second column (second pixel column) can further include a second main column line CLb_M commonly connected to a second main sub-pixel SPb_M included in each of two pixels P(1,2) and P(2,2) arranged in the second column (or second pixel column), and a second redundancy column line CLb_R commonly connected to a second redundancy sub-pixel SPb_R included in each of two pixels P(1,2) and P(2,2) arranged in the second column (or second pixel column).

The second main sub-pixel SPb_M included in each of the two pixels P(1,2) and P(2,2) arranged in the second column (or the second pixel column) can include a second main light emitting device EDb_M, and the second redundancy sub-pixel SPb_R included in each of the two pixels P(1,2) and P(2,2) arranged in the second column (or the second pixel column) can include a second redundancy light emitting device EDb_R.

The second main column line CLb_M arranged in the second column (or the second pixel column) can be commonly connected to the first electrodes Ecl of the two second main light emitting devices EDb_M arranged in the second column (or the second pixel column).

The second redundancy column line CLb_R arranged in the second column (or the second pixel column) can be commonly connected to the first electrodes Ecl of two second redundancy light emitting devices EDb_R arranged in the second column (or the second pixel column).

Further, the plurality of first column lines CL arranged in the second column (or the second pixel column) can further include a third main column line CLc_M commonly connected to a third main sub-pixel SPc_M included in each of two pixels P(1,2) and P(2,2) arranged in the second column (or the second pixel column), and a third redundancy column line CLc_R commonly connected to a third redundancy sub-pixel SPc_R included in each of two pixels P(1,2) and P(2,2) arranged in the second column (or the second pixel column).

The third main sub-pixel SPc_M included in each of the two pixels P(1,2) and P(2,2) arranged in the second column (or the second pixel column) can include a third main light emitting device EDc_M, and the third redundancy sub-pixel SPc_R included in each of the two pixels P(1,2) and P(2,2) arranged in the second column (or the second pixel column) can include a third redundancy light emitting device EDc_R.

The third main column line CLc_M arranged in the second column (or the second pixel column) can be commonly connected to the first electrodes Ecl of the two third main light emitting devices EDc_M arranged in the second column (or the second pixel column).

The third redundancy column line CLc_R arranged in the second column (or the second pixel column) can be commonly connected to the first electrodes Ecl of two third redundancy light emitting devices EDc_R arranged in the second column (or the second pixel column).

In each of the first column (or the first pixel column) and the second column (or the second pixel column), each of the plurality of column lines CL can include at least one column connection electrode having a shape protruding above a bank BNK. For example, the at least one column connection electrode can be an electrode electrically connected to each of the plurality of column lines CL or a portion protruding from each of the plurality of column lines C.

Each of the first main column line CLa_M, the second main column line CLb_M, and the third main column line CLc_M can include a main column connection electrode CCE_M protruding above the bank BNK and extending above the bank BNK.

The first main light emitting devices EDa_M, the second main light emitting devices EDb_M, and the third main light emitting devices EDc_M can be arranged on the main column connection electrodes CCE_M arranged to extend above the bank BNK.

Figure 10:
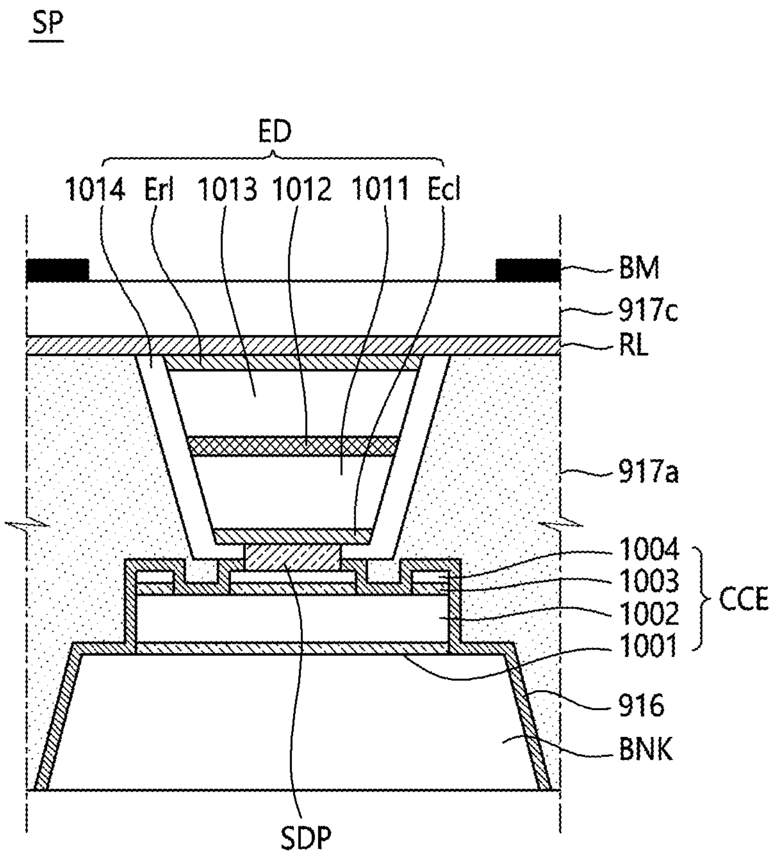
Figure 11:
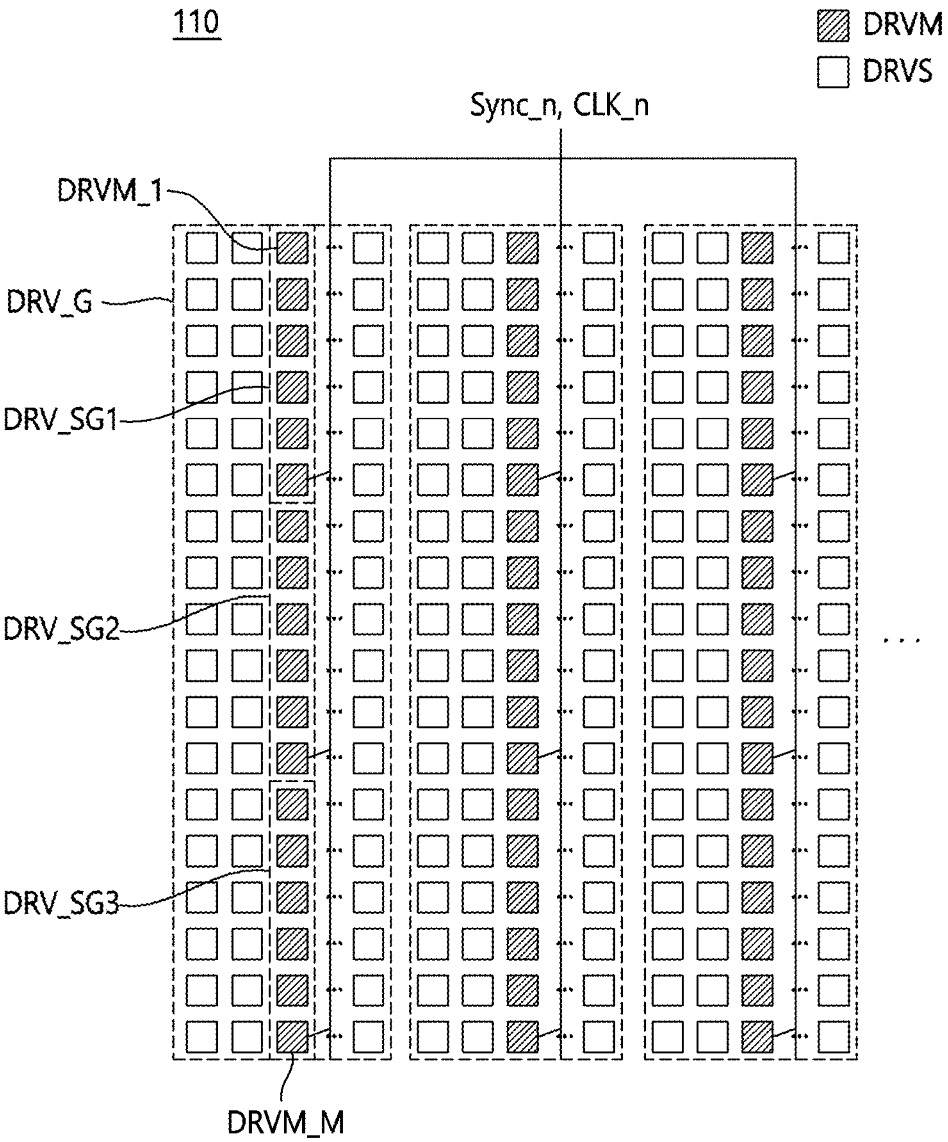
FIGS. 11 and 12 are diagrams for explaining a driver provided in a display device according to embodiments of the present disclosure.

Referring to FIGS. 10 and 11, in each of the first column (or first pixel column) and the second column (or second pixel column), each of the first redundancy column line CLa_R, the second redundancy column line CLb_R, and the third redundancy column line CLc_R can include a redundancy column connection electrode CCE_R that protrudes toward the bank BNK and extends above the bank BNK.

On the redundancy column connection electrodes CCE_R arranged to extend above the bank BNK, the first redundancy light emitting devices EDa_R, the second redundancy light emitting devices EDb_R, and the third redundancy light emitting devices EDc_R can be arranged.

The main column connection electrodes CCE_M and the redundancy column connection electrodes CCE_R arranged in the first column (or the first pixel column) can be disposed between the first main column line CLa_M and the first redundancy column line CLa_R.

The main column connection electrodes CCE_M and the redundancy column connection electrodes CCE_R arranged in the second column (or the second pixel column) can be disposed between the second main column line CLb_M and the second redundancy column line CLb_R.

The main column connection electrodes CCE_M and the redundancy column connection electrodes CCE_R arranged in the third column (or the third pixel column) can be disposed between the third main column line CLc_M and the third redundancy column line CLc_R.

The display panel 110 according to the embodiments of the present disclosure can further include at least one row connection electrode for electrically connecting each of the plurality of row lines RL to the driver DRV.

The display panel 110 according to the embodiments of the present disclosure can further include at least one first row connection electrode RCE(1) connected to a first row line RL(1) arranged in a first row (or a first pixel row), and at least one second row connection electrode RCE(2) connected to a second row line RL(2) arranged in a second row (or a second pixel row).

The first row line RL(1) can be vertically overlapped with at least one first row connection electrode RCE(1), and the second row line RL(2) can be vertically overlapped with at least one second row connection electrode RCE(2).

The first row line RL(1) can be electrically connected to the row driver R-DRV of the corresponding driver DRV through at least one first row connection electrode RCE(1). The second row line RL(2) can be electrically connected to the row driver R-DRV of the corresponding driver DRV through at least one second row connection electrode RCE (2).

According to embodiments of the present disclosure, a bank BNK can be arranged in each of a plurality of sub-pixels SP. The plurality of banks BNK can be structures on which a plurality of light emitting devices ED are mounted. When manufacturing a panel, in a transfer process for transferring a plurality of light emitting devices ED to a display device 100, a plurality of banks BNK can guide the positions of the plurality of light emitting devices ED. For example, when manufacturing a panel, a plurality of light emitting devices ED can be transferred onto a plurality of banks BNK in a transfer process of the plurality of light emitting devices ED. The plurality of banks BNK can be an organic insulating layer, a bank pattern, or a structure, but the embodiments of the present disclosure are not limited thereto.

The banks BNK of each of the plurality of sub-pixels SP can be arranged to be spaced apart from each other. The banks BNK of each of the plurality of sub-pixels SP can be configured to be separated from each other. Accordingly, the banks BNK of the first sub-pixel SPa, the second sub-pixel SPb, and the third sub-pixel SPc to which different types of light emitting devices ED are transferred can be easily identified.

The bank BNK of the first main sub-pixel SPa_M and the bank BNK of the first redundancy sub-pixel SPa_R can be connected to each other, or can be formed spaced apart from each other or separately. For example, considering the design of the transfer process requirements, the bank BNK of the first main sub-pixel SPa_M and the bank BNK of the first redundancy sub-pixel SPa_R, in which light emitting devices EDa_M, EDa_R of the same type (for example, types that emit the same color light) are arranged, can be connected to each other, or can be formed spaced apart from each other or separately. In addition, the bank BNK of the second main sub-pixel SPb_M and the bank BNK of the second redundancy sub-pixel SPb_R can be connected to each other, or can be formed spaced apart from each other or separately. The bank BNK of the third main sub-pixel SPc_M and the bank BNK of the third redundancy sub-pixel SPc_R can be connected to each other, or can be formed to be spaced apart from each other or separated from each other.

The bank BNK of the first main sub-pixel SPa_M and the first redundancy sub-pixel SPa_R, the bank BNK of the second main sub-pixel SPb_M and the second redundancy sub-pixel SPb_R, and the bank BNK of the third main sub-pixel SPc_M and the third redundancy sub-pixel SPc_R can be formed in various ways, and the embodiments of the present disclosure are not limited thereto.

For example, the plurality of banks BNK can be formed of an organic insulating material. The plurality of banks BNK can be formed of a single layer or multiple layers of an organic insulating material. For example, the plurality of banks BNK can be composed of a photo resist, a polyimide (PI), or an acrylic material, but the embodiments of the present disclosure are not limited thereto.

The plurality of row lines RL can be formed of a transparent conductive material, but the embodiments of the present disclosure are not limited thereto. The plurality of row lines RL can be composed of a transparent conductive material so that light emitted from the light emitting devices ED can be directed upward through the row lines RL. For example, the plurality of row lines RL can be composed of a transparent conductive material such as indium tin oxide (ITO), indium zinc oxide (IZO), indium gallium zinc oxide (IGZO), and the like, but the embodiments of the present disclosure are not limited thereto.

The plurality of column lines CL can be made of a conductive material. For example, the plurality of column lines CL can be formed of a conductive material such as titanium (Ti), aluminum (Al), copper (Cu), molybdenum (Mo), nickel (Ni), chromium (Cr), indium tin oxide (ITO), indium zinc oxide (IZO), indium gallium zinc oxide (IGZO), but the embodiments of the present disclosure are not limited thereto. For another example, the plurality of column lines CL can have a multilayer structure of conductive materials. For example, the plurality of column lines CL can be made of a multilayer structure of titanium (Ti)/aluminum (Al)/titanium (Ti)/indium tin oxide (ITO), but the embodiments of the present disclosure are not limited thereto.

For example, if the light emitting device ED is a device manufactured through a semiconductor process, such as a micro LED, a plurality of light emitting devices ED can be formed on a wafer and the light emitting devices ED can be transferred to a substrate 210 of the display panel 110 to manufacture the display panel 110. In the process of transferring a plurality of light emitting devices ED having a microscopic size from the wafer to the substrate 210, various defects can occur. For example, a non-transfer defect can occur in which the light emitting device ED is not transferred in some sub-pixels SP, and a misalignment defect can occur in which the light emitting device ED is transferred out of its proper position due to an alignment error in other sub-pixels SP. In addition, the transfer process can proceed normally, but the transferred light emitting device ED itself can have a defect. Therefore, considering the defects (including non-transfer defects) that occur during the transfer process of the light emitting devices EDs, the main light emitting device and the redundancy light emitting device, which are light emitting devices of the same type (e.g., light emitting devices that emit light of the same color), can be transferred to one sub-pixel SP. A lighting test can be performed on the main light emitting device and the redundancy light emitting device of the same type, and it is possible to utilize only one of the main light emitting device and the redundancy light emitting device that is finally determined to be normal.

For example, the first main light emitting device EDa_M and the first redundancy light emitting device EDa_R can be transferred together to one first sub-pixel SPa, and the first main light emitting device EDa_M and the first redundancy light emitting device EDa_R can be inspected for defects. If, as a result of the inspection, both the first main light emitting device EDa_M and the first redundancy light emitting device EDa_R are determined to be normal, only the first main light emitting device EDa_M can be used, and the first redundancy light emitting device EDa_R can be not used. If, as a result of the inspection, only the first redundancy light emitting device EDa_R among the first main light emitting device EDa_M and the first redundancy light emitting device EDa_R is normal, the first main light emitting device EDa_M is not used, and only the first redundancy light emitting device EDa_R can be used. Accordingly, even if the same first main light emitting device EDa_M and the first redundancy light emitting device EDa_R are transferred to one first sub-pixel SPa, only one of the first main light emitting device EDa_M and the first redundancy light emitting device EDa_R can be finally used.

Accordingly, among the main light emitting device and the redundancy light emitting device arranged in one sub-pixel SP, the redundancy light emitting device can be a spare light emitting device transferred in preparation for a failure of the main light emitting device. In the event of a failure of the main light emitting device, the redundancy light emitting device can be used as a replacement. Therefore, by transferring the main light emitting device and the redundancy light emitting device together to one sub-pixel SP, it is possible to minimize the deterioration of display quality due to a defect in one of the main light emitting device and the redundancy light emitting device.

In the embodiments of the present disclosure, the first main sub-pixel SPa_M and the first redundancy sub-pixel SPa_R can also be referred to as a 1-1 sub-pixel and a 1-2 sub-pixel, respectively, the second main sub-pixel SPb_M and the second redundancy sub-pixel SPb_R can also be referred to as a 2-1 sub-pixel and a 2-2 sub-pixel, and the third main sub-pixel SPc_M and the third redundancy sub-pixel SPc_R can also be referred to as a 3-1 sub-pixel and a 3-2 sub-pixel, respectively.

In the embodiments of the present disclosure, the first main light emitting device EDa_M and the first redundancy light emitting device EDa_R can also be referred to as a 1-1 light emitting device and a 1-2 light emitting device, the second main light emitting device EDb_M and the second redundancy light emitting device EDb_R can also be referred to as a 2-1 light emitting device and a 2-2 light emitting device, and the third main light emitting device EDc_M and the third redundancy light emitting device EDc_R can also be referred to as a 3-1 light emitting device and a 3-2 light emitting device.

The display panel 110 according to the embodiments of the present disclosure can further include a plurality of communication lines NL. The plurality of communication lines NL can be arranged so as not to overlap with the metal layer in a vertical direction. For example, a plurality of communication lines NL can be arranged between a first row line RL(1) and a second row line RL(2.

For example, the plurality of communication lines NL can be wires for short-range communication such as NFC (Near Field Communication) and Bluetooth. The plurality of communication lines NL can serve as signal transmission wires and/or antennas, but the embodiments of the present disclosure are not limited thereto.

Referring to FIG. 8, the first row line RL(1) can be arranged above a plurality of light emitting devices arranged in the first row (or the first pixel row) and can be arranged in a bar shape overlapping with all of the plurality of light emitting devices arranged in the first row (or the first pixel row).

The second row line RL(2) can be arranged above the plurality of light emitting devices arranged in the second row (or the second pixel row), and can be arranged in a bar shape overlapping with all of the plurality of light emitting devices arranged in the second row (or the second pixel row).

Figure 9:
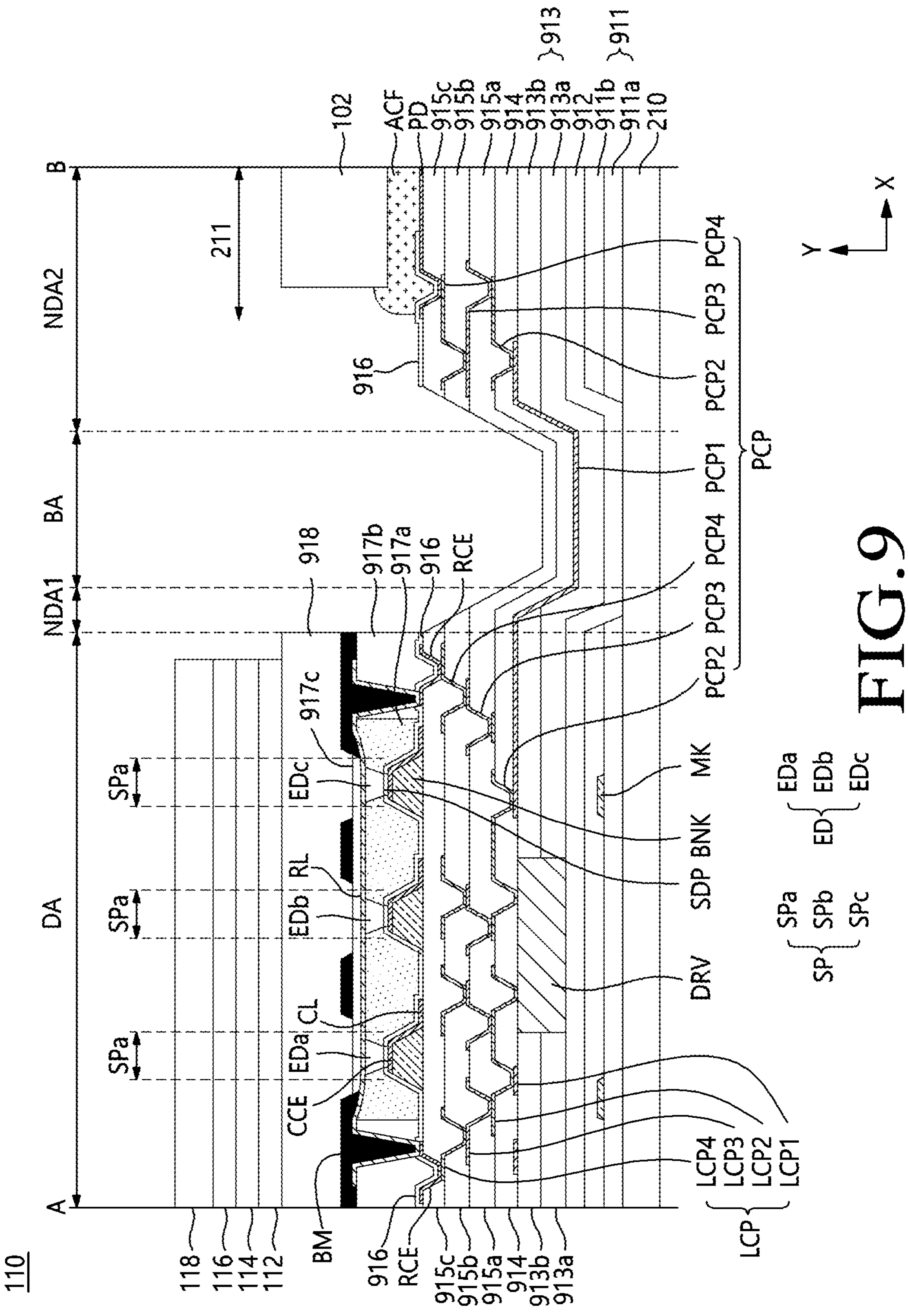
FIGS. 9 and 10 are diagrams for more specifically explaining a display panel according to embodiments of the present disclosure.

FIGS. 9 and 10 are diagrams for more specifically explaining a display panel 110 according to embodiments of the present disclosure.

Specifically, FIG. 9 is a detailed cross-sectional view of a display panel 110 according to embodiments of the present disclosure taken along the A-B cutting line of FIG. 6, and FIG. 10 is an enlarged cross-sectional view of a sub-pixel SP of a display panel 110 according to embodiments of the present disclosure.

Meanwhile, for convenience of illustration, the A-B cutting line in FIG. 6 is illustrated as not overlapping with a signal line SL and a link line LL, but the A-B cutting line in FIG. 6 is intended to indicate the same position as the adjacent signal line SL and the link line LL.

Referring to FIG. 9, a buffer layer 911 can be disposed on the substrate 210. The buffer layer 911 can include a first buffer layer 911*a* and a second buffer layer 911*b*. The first buffer layer 911*a* and the second buffer layer 911*b* can be arranged in the display area DA, the first non-display area NDA1, and the second non-display area NDA, and may not be arranged in the entirety or part of the bending area BA. However, the present disclosure is not limited thereto.

The first buffer layer 911*a* and the second buffer layer 911*b* can reduce the penetration of moisture or impurities through the substrate 210. The first buffer layer 911*a* and the second buffer layer 911*b* can be made of an inorganic insulating material. For example, the first buffer layer 911*a* and the second buffer layer 911*b* can be composed of a single layer or multiple layers of silicon oxide (SiOx) or silicon nitride (SiNx), but the embodiments of the present disclosure are not limited thereto.

For example, a portion of the first buffer layer 911*a* and the second buffer layer 911*b* on the bending area BA can be removed. The upper surface of the substrate 210 located on the bending area BA can be exposed by the area (e.g., opening) where the first buffer layer 911*a* and the second buffer layer 911*b* are removed.

By removing the first buffer layer 911*a* and the second buffer layer 911*b* from the bending area BA, it is possible to minimize an occurrence of cracks in the first buffer layer 911*a* and the second buffer layer 911*b* that can occur during bending.

A plurality of alignment keys MK can be arranged between the first buffer layer 911*a* and the second buffer layer 911*b*. The plurality of alignment keys MK can be configured to identify the position of the driver DRV during the manufacturing process of the display panel 110. For example, the plurality of alignment keys MK can be configured to align the position of the driver DRV transferred on the adhesive layer 912. In another example, the plurality of alignment keys MK can be omitted.

An adhesive layer 912 can be disposed on the second buffer layer 911*b*. The adhesive layer 912 can be disposed in the display area DA, the first non-display area NDA1, the bending area BA, and the second non-display area NDA2. For another example, at least a portion of the adhesive layer 912 can be removed in the non-display area NDA including the bending area BA. For example, the adhesive layer 912 can be made of any one of an adhesive polymer, an epoxy resin, a UV-curable resin, a polyimide series, an acrylate series, a urethane series, and a polydimethylsiloxane (PDMS), but the embodiments of the present disclosure are not limited thereto.

A driver DRV can be disposed on the adhesive layer 912 in the display area DA. If the driver DRV is implemented as a driving chip (e.g., driver integrated circuit), the driver can be mounted on the adhesive layer 912 by a transfer process, but the embodiments of the present disclosure are not limited thereto.

The display panel 110 can further include a side protection layer 913 disposed on the side of the plurality of drivers DRV, and an upper protection layer 914 disposed on the plurality of drivers DRV and the side protection layer 913.

For example, the side protection layer 913 can include at least one of a first protection layer 913*a* and a second protection layer 913*b* disposed on the side of the plurality of drivers DRV, and in some cases, can further include at least one additional protection layer. The first protection layer 913*a* and the second protection layer 913*b* can be disposed on the adhesive layer 912. The first protection layer 913*a* and the second protection layer 913*b* can be arranged to surround the side surface of the driver DRV, but the embodiments of the present disclosure are not limited thereto. For example, the second protection layer 913*b* can be arranged to cover at least a portion of the upper surface of the driver DRV. For example, at least one of the first protection layer 913*a* and the second protection layer 913*b* arranged on the bending area BA can be omitted. For example, the first protection layer 913*a* can be arranged entirely on the display area DA and the non-display area NDA, and the second protection layer 913*b* can be partially arranged on the display area DA, the first non-display area NDA1, and the second non-display area NDA2. For example, at least a portion of the second protection layer 913*b* can be removed in all or part of the bending area BA. However, the embodiments of the present disclosure are not limited thereto.

For example, the side protection layer 913 including at least one of the first protection layer 913*a* and the second protection layer 913*b* can be composed of an organic insulating material (i.e., organic layer), but the embodiments of the present disclosure are not limited thereto. For example, the first protection layer 913*a* and the second protection layer 913*b* can be composed of a photo resist, a polyimide (PI), or a photo acryl-based material, but the embodiments of the present disclosure are not limited thereto. For example, the first protection layer 913*a* and the second protection layer 913*b* can be an overcoating layer or an insulating layer, but the embodiments of the present disclosure are not limited thereto.

According to embodiments of the present disclosure, in the display area DA, a plurality of line connection patterns LCP can be arranged on the second protection layer 913*b*. The plurality of line connection patterns LCP can be wiring for electrically connecting the driver DRV to other components. For example, the driver DRV can be electrically connected to a plurality of column lines CL, a plurality of row lines RL, and a plurality of row connection electrodes RCE through the plurality of line connection patterns LCP.

For example, the plurality of line connection patterns LCP can include a first line connection pattern LCP1, a second line connection pattern LCP2, a third line connection pattern LCP3, and a fourth line connection pattern LCP4, but the embodiments of the present disclosure are not limited thereto. For example, the first line connection pattern LCP1, the second line connection pattern LCP2, the third line connection pattern LCP3, and the fourth line connection pattern LCP4 can be arranged in different metal layers.

For example, a plurality of first line connection patterns LCP1 can be arranged on the second protection layer 913*b*. The plurality of first line connection patterns LCP1 can be electrically connected to the driver DRV. The plurality of first line connection patterns LCP1 can transmit the voltage output from the driver DRV to the column line CL or the row line RL.

For example, the upper protection layer 914 can include a third protection layer 914, and in some cases, can further include at least one additional protection layer. The third protection layer 914 can be disposed on the second protection layer 913*b* and the plurality of first line connection patterns LCP1. The third protection layer 914 can be disposed entirely in the display area DA and the non-display area NDA. In the bending area BA, the third protection layer 914 can cover or enclose the side surface of the second protection layer 913*b* and the upper surface of the first protection layer 913*a*.

For example, the third protection layer 914 can be composed of an organic insulating material. For example, the third protection layer 914 can be composed of a photo resist, a polyimide (PI), or a photo acryl-based material, but the embodiments of the present disclosure are not limited thereto. For example, the first protection layer 913*a*, the second protection layer 913*b*, and the third protection layer 914 can be composed of the same insulating material, or at least one of the first protection layer 913*a*, the second protection layer 913, and the third protection layer 914 can be composed of a different insulating material from the rest. However, the embodiments of the present disclosure are not limited thereto.

A plurality of second line connection patterns LCP2 can be arranged on the third protection layer 914. The plurality of second line connection patterns LCP2 can be electrically connected or directly connected to the driver DRV. For example, some of the second line connection patterns LCP2 can be directly or indirectly connected to the driver DRV through contact holes of the third protection layer 914. Other parts of the second line connection patterns LCP2 can be electrically connected to the first line connection pattern LCP1 through contact holes of the third protection layer 914. However, the embodiments of the present disclosure are not limited thereto. The voltage output from the driver DRV can be transmitted to the column line CL or the row line RL through the plurality of second line connection patterns LCP2 and other connection patterns.

A first insulating layer 915*a* can be disposed on the plurality of second line connection patterns LCP2. The first insulating layer 915*a* can be disposed entirely over the display area DA and the non-display area NDA, but the embodiments of the present disclosure are not limited thereto. The first insulating layer 915*a* can be composed of an organic insulating material, but the embodiments of the present disclosure are not limited thereto. For example, the first insulating layer 915*a* can be composed of a photo resist, a polyimide (PI), or a photo acryl-based material, but the embodiments of the present disclosure are not limited thereto.

A plurality of third line connection patterns LCP3 can be disposed on the first insulating layer 915*a*. The plurality of third line connection patterns LCP3 can be electrically connected to the plurality of second line connection patterns LCP2. For example, the third line connection pattern LCP3 can be electrically connected to the second line connection pattern LCP2 through a contact hole of the first insulating layer 915*a*.

A second insulating layer 915*b* can be disposed on a plurality of third line connection patterns LCP3. The second insulating layer 915*b* can be disposed in the display area DA, the first non-display area NDA1, and the second non-display area NDA2, and may not be disposed in the entirety or part of the bending area BA, but the embodiments of the present disclosure are not limited thereto. For example, the second insulating layer 915*b* can be removed from the entirety or part of the bending area BA. The second insulating layer 915*b* can be composed of an organic insulating material, but the embodiments of the present disclosure are not limited thereto. For example, the second insulating layer 915*b* can be composed of a photo resist, a polyimide (PI), or a photo acryl-based material, but the embodiments of the present disclosure are not limited thereto.

A plurality of fourth line connection patterns LCP4 can be arranged on the second insulating layer 915*b*. The plurality of fourth line connection patterns LCP4 can be electrically connected to a plurality of third line connection patterns LCP3. For example, the fourth line connection patterns LCP4 can be electrically connected to the third line connection patterns LCP3 through a contact hole of the second insulating layer 915*b*.

According to the embodiments of the present disclosure, in the non-display area NDA, a plurality of pad connection patterns PCP can be arranged on the second protection layer 913*b*. A plurality of pad connection patterns PCPs can be wiring for transmitting a signal transmitted from a flexible printed circuit 102 to a pad section 211 to a driver DRV of a display area DA. For example, a plurality of pad connection patterns PCP can be electrically connected to a plurality of pads PDs and can receive signals from the flexible printed circuit 102 through the plurality of pads PDs. The flexible printed circuit 102 can be connected to a printed circuit board 104 (see FIGS. 1 and 2).

For example, a plurality of pad connection patterns PCP can extend from the pad section 211 toward the display area DA and transmit signals to the wiring of the display area DA. In this case, a plurality of pad connection patterns PCP can function as link wiring LL ('LL' in FIG. 6). The plurality of pad connection patterns PCP can include a first pad connection pattern PCP1, a second pad connection pattern PCP2, a third pad connection pattern PCP3, and a fourth pad connection pattern PCP4.

The plurality of first pad connection patterns PCP1 can be arranged on the second protection layer 913*b*. Each of the plurality of first pad connection patterns PCP1 can be arranged across the second non-display area NDA2, the bending area BA, and the first non-display area NDA1. Each of the plurality of first pad connection patterns PCP1 can include a first portion arranged in the bending area BA, a second portion extending from the first portion to the first non-display area NDA1, and a third portion extending from the first portion to the second non-display area NDA2. Each of the plurality of first pad connection patterns PCP1 can extend from the first non-display area NDA1 to a portion of the display area DA. The plurality of first pad connection patterns PCP1 can transmit a signal transmitted from the flexible printed circuit 102 to the pad portion 211 to the driver DRV of the display area DA.

Each of the plurality of first pad connection patterns PCP1 can be electrically connected to the pad PD of the pad section 211 through connection patterns arranged in the second non-display area NDA2. Here, the connection patterns electrically connecting each of the plurality of first pad connection patterns PCP1 to the pad PD can include at least one of the second pad connection pattern PCP2, the third pad connection pattern PCP3, and the fourth pad connection pattern PCP4 arranged in the second non-display area NDA2.

Each of the plurality of first pad connection patterns PCP1 can be electrically connected to the driver DRV through connection patterns arranged in the display area DA. Here, the connection patterns electrically connecting each of the plurality of first pad connection patterns PCP1 to the driver DRV can include at least one of the second pad connection pattern PCP2, the third pad connection pattern PCP3, and the fourth pad connection pattern PCP4 arranged in the display area DA.

The plurality of second pad connection patterns PCP2 can be arranged on the third protection layer 914. The plurality of second pad connection patterns PCP2 can be arranged in the second non-display area NDA2. The second pad connection pattern PCP2 can be electrically connected to the first pad connection pattern PCP1 through a contact hole of the third protection layer 914. Therefore, the signal supplied from the flexible printed circuit 102 can be transmitted to the first pad connection pattern PCP1 through the second pad connection pattern PCP.

The third pad connection pattern PCP3 can be arranged on the first insulating layer 915*a*. The third pad connection pattern PCP3 can be arranged in the second non-display area NDA2. The third pad connection pattern PCP3 can be electrically connected to the second pad connection pattern PCP2 through a contact hole of the first insulating layer 915*a*. Therefore, the signal supplied from the flexible printed circuit 102 can be transmitted to the second pad connection pattern PCP2 through the third pad connection pattern PCP3, and the signal transmitted to the second pad connection pattern PCP2 can be transmitted again to the first pad connection pattern PCP1.

The fourth pad connection pattern PCP4 can be arranged on the second insulating layer 915*b*. The fourth pad connection pattern PCP4 can be arranged in the second non-display area NDA2. The fourth pad connection pattern PCP4 can be electrically connected to the third pad connection pattern PCP3 through a contact hole of the second insulating layer 915*b*. The pad PD of the pad section 211 can be electrically connected to the fourth pad connection pattern PCP4 through a contact hole of the third insulating layer 915*c*.

A signal supplied from a flexible printed circuit 102 is input to a pad PD of a pad section 211, and a signal input to the pad PD is transmitted to a third pad connection pattern PCP3 through a fourth pad connection pattern PCP4, and a signal transmitted to the third pad connection pattern PCP3 can be transmitted again to a first pad connection pattern PCP1 through a second pad connection pattern PCP2. A signal transmitted to the first pad connection pattern PCP1 can be transmitted to a driver DRV through connection patterns arranged in a display area DA.

A plurality of line connection patterns LCP and a plurality of pad connection patterns PCP can be arranged in various metal layers. The plurality of line connection patterns LCP and the plurality of pad connection patterns PCP can be formed of any one of a conductive material having excellent ductility or various conductive materials used in a display area DA.

For example, a metal pattern such as a first pad connection pattern PCP1 at least partially disposed in the bending area BA can be composed of a conductive material having excellent ductility, such as gold (Au), silver (Ag), or aluminum (Al), but the embodiments of the present disclosure are not limited thereto. For another example, the plurality of line connection patterns LCP and the plurality of pad connection patterns PCP can be composed of molybdenum (Mo), chromium (Cr), titanium (Ti), nickel (Ni), neodymium (Nd), copper (Cu), and an alloy of silver (Ag) and magnesium (Mg), or an alloy thereof, but the embodiments of the present disclosure are not limited thereto.

A third insulating layer 915*c* can be disposed on the plurality of line connection patterns LCP and the plurality of pad connection patterns PCP. The third insulating layer 915*c* is disposed in the display area DA, the first non-display area NDA1, and the second non-display area NDA2, and can be disposed in all or part of the bending area BA, but the embodiments of the present disclosure are not limited thereto. In the bending area BA, a part of the third insulating layer 915*c* can be removed. The third insulating layer 915*c* can be composed of an organic insulating material, but the embodiments of the present disclosure are not limited thereto. For example, the third insulating layer 915*c* can be composed of a photo resist, a polyimide (PI), or a photo acryl-based material, but the embodiments of the present disclosure are not limited thereto.

A plurality of banks BNK can be disposed on the third insulating layer 915*c* in the display area DA. The plurality of banks BNKs can be arranged to overlap with at least a portion of each of the plurality of sub-pixels SPa, SPb and SPc. For example, the first sub-pixel SPa can include a first light emitting device EDa that emits a first color light, the second sub-pixel SPb can include a second light emitting device EDb that emits a second color light, and the third sub-pixel SPc can include a third light emitting device EDc that emits a third color light.

As an example, one light emitting device ED can be arranged on top of each of the plurality of banks BNKs. As another example, two or more light emitting devices ED can be arranged on top of each of the plurality of banks BNK. The two or more light emitting devices EDs arranged on top of each of the plurality of banks BNK can be light emitting devices of the same type. For example, the light emitting devices of the same type can be light emitting devices that emit the same color light. For example, the two or more light emitting devices ED arranged on top of each of the plurality of banks BNK can include a main light emitting device and a redundancy light emitting device.

In the display area DA, a plurality of row connection electrodes RCE can be arranged on the third insulating layer 915*c*. The plurality of row connection electrodes RCE can transfer a low-potential voltage VSS output from the driver DRV to the row line RL.

In the display area DA, a plurality of column lines CL can be arranged on the third insulating layer 915*c*. The plurality of column lines CL can be arranged in an area between the plurality of banks BNK. For example, the plurality of column lines CL can be arranged adjacent to one of the plurality of banks BNK.

Each of the plurality of column lines CL can include a wiring portion and a column connection electrode CCE protruding from the wiring portion. The wiring portion and the column connection electrode CCE included in each of the plurality of column lines CL can be formed integrally or can be different metals that are electrically connected.

For example, each of the plurality of column lines CL can include a column connection electrode CCE that is a portion protruding above an adjacent bank BNK among the plurality of banks BNK. The column connection electrode CCE of each of the plurality of column lines CL can be arranged to extend along the side and upper surface of the bank BNK. The column connection electrode CCE can be an electrode electrically connected to each of the plurality of column lines CL or can be a portion protruding from each of the plurality of column lines CL.

Referring to FIG. 10, the column connection electrode CCE of the column line CL can be composed of one conductive layer or multiple conductive layers. For example, a column connection electrode CCE electrically connected to a column line CL or protruding from the column line CL can include a first conductive layer 1001, a second conductive layer 1002, a third conductive layer 1003, and a fourth conductive layer 1004, but the embodiments of the present disclosure are not limited thereto.

The first conductive layer 1001 can be disposed on a bank BNK. The second conductive layer 1002 can be disposed on the first conductive layer 1001. The third conductive layer 1003 can be disposed on the second conductive layer 1002, and the fourth conductive layer 1004 can be disposed on the third conductive layer 1003. For example, each of the first conductive layer 1001, the second conductive layer 1002, the third conductive layer 1003, and the fourth conductive layer 1004 can be composed of titanium (Ti), molybdenum (Mo), aluminum (Al), or titanium (Ti) and indium tin oxide (ITO), but the embodiments of the present disclosure are not limited thereto.

According to the embodiments of the present disclosure, among the plurality of conductive layers constituting the column connection electrode CCE, some conductive layers having good reflection efficiency can be configured as an alignment key and/or a reflector for aligning the light emitting devices ED. For example, among the plurality of conductive layers constituting the column connection electrode CCE, the second conductive layer 1002 can include a reflective material. For example, the second conductive layer 1002 can include aluminum (Al), but the embodiments of the present disclosure are not limited thereto. Accordingly, the second conductive layer 1002 can be configured as a reflector. In addition, due to the high reflection efficiency of the second conductive layer 1002, it can be easily identified in the manufacturing process, and thus the position or transfer position of the light emitting device ED can be aligned based on the second conductive layer 1002.

For example, in order to configure the second conductive layer 1002 as a reflector, the third conductive layer 1003 and the fourth conductive layer 1004 disposed on the second conductive layer 1002 can be partially removed or etched. For example, a portion of the third conductive layer 1003 and the fourth conductive layer 1004 disposed on the bank BNK can be removed or etched to expose the upper surface of the second conductive layer 1002. For example, the openings of the third conductive layer 1003 and the fourth conductive layer 1004 can overlap with a portion of the upper surface of the second conductive layer 1002. For example, in the third conductive layer 1003 and the fourth conductive layer 1004, the central portion and the edge portion where a solder pattern SDP is arranged can remain, and the remaining portions excluding this portion (e.g., the central portion, the edge portion) can be removed. For example, the edge portion of each of the third conductive layer 1003 made of titanium (Ti) and the fourth conductive layer 1004 made of indium tin oxide (ITO) may not be etched. Accordingly, it is possible to prevent other conductive layers of the column connection electrode CCE of the column line CL from being corroded by the TMAH (Tetra Methyl Ammonium Hydroxide) solution used in the mask process of the column connection electrode CCE.

According to the embodiments of the present disclosure, the first conductive layer 1001 and the third conductive layer 1003 can include titanium (Ti) or molybdenum (Mo). The second conductive layer 1002 can include aluminum (Al). The fourth conductive layer 1004 can include a transparent conductive oxide layer such as indium tin oxide (ITO) or indium zinc oxide (IZO) that has good adhesion to the solder pattern SDP and corrosion resistance and acid resistance. However, the embodiments of the present disclosure are not limited thereto.

The first conductive layer 1001, the second conductive layer 1002, the third conductive layer 1003, and the fourth conductive layer 1004 can be sequentially deposited and then patterned by performing a photolithography process and an etching process, but the embodiments of the present disclosure are not limited thereto.

According to embodiments of the present disclosure, two or more of the column connection electrode CCE, the column line CL, the row connection electrode RCE, and the pad PD can be arranged on the same layer. The column connection electrode CCE, the column line CL, the row connection electrode RCE, and the pad PD can be composed of a single layer or multiple layers of a conductive material, but the embodiments of the present disclosure are not limited thereto. For example, two or more of the column connection electrode CCE, the column line CL, the row connection electrode RCE, and the pad PD can be composed of a multiple layer of indium tin oxide (ITO)/titanium (Ti)/aluminum (Al)/titanium (Ti), but the embodiments of the present disclosure are not limited thereto.

According to embodiments of the present disclosure, a solder pattern SDP can be arranged on the column connection electrode CCE in each of a plurality of sub-pixels. The solder pattern SDP can bond the light emitting device ED to the column connection electrode CCE. The column connection electrode CCE and the light emitting device ED can be electrically connected through eutectic bonding using the solder pattern SDP, but the embodiments of the present disclosure are not limited thereto. For example, if the solder pattern SDP is composed of indium (In) and the first electrode Ecl of the light emitting device ED is composed of gold (Au), the solder pattern SDP and the first electrode Ecl of the light emitting device ED can be bonded by applying heat and pressure in a transfer process of the light emitting device ED. Through eutectic bonding, the light emitting device ED can be bonded to the solder pattern SDP and the column connection electrode CCE without a separate adhesive. For example, the solder pattern SDP can be composed of indium (In), tin (Sn), or an alloy thereof, but the embodiments of the present disclosure are not limited thereto. For example, the solder pattern SDP can be a bonding pad, but the embodiments of the present disclosure are not limited thereto.

According to the embodiments of the present disclosure, the passivation layer 916 can be disposed on a plurality of column lines CL, a plurality of column connection electrodes CCE, a plurality of row connection electrodes RCE, and a third insulating layer 915*c*.

For example, the passivation layer 916 can be disposed on a display area DA, a first non-display area NDA1, and a second non-display area NDA2. In the entirety or a portion of the bending area BA, at least a portion of the passivation layer 916 covering the plurality of pads PD can be removed. A portion of the passivation layer 916 covering the plurality of pads PD in the second non-display area NDA2 can be removed. In addition, as illustrated in FIG. 10, the passivation layer 916 can be removed from the area where the solder pattern SDP is arranged.

Since the passivation layer 916 is arranged to cover the remaining area except for the bending area BA, the plurality of pads PD, and the area where the solder pattern SDP is arranged, the penetration of moisture or impurities into the light emitting device ED can be reduced. For example, the passivation layer 916 can be composed of a single layer or multiple layers of silicon oxide (SiOx) or silicon nitride (SiNx), but the embodiments of the present disclosure are not limited thereto. For example, the passivation layer 916 can be a protection layer or an insulating layer, but the embodiments of the present disclosure are not limited thereto. For example, as illustrated in FIG. 10, the passivation layer 916 can include a hole through which the solder pattern SDP is exposed. For example, the hole of the passivation layer 916 can overlap with the solder pattern SDP.

A light emitting device ED can be arranged on the solder pattern SDP in each of a plurality of sub-pixels SP. The light emitting device ED can be formed on a silicon wafer by a method such as Metal Organic Chemical Vapor Deposition (MOCVD), Chemical Vapor Deposition (CVD), Plasma-Enhanced Chemical Vapor Deposition (PDCVD), Molecular Beam Epitaxy (MBE), Hydride Vapor Phase Epitaxy (HVPD), or Sputtering, but the embodiments of the present disclosure are not limited thereto.

The light emitting device ED can include a first electrode Ecl, a first semiconductor layer 1011, an active layer 1012, a second semiconductor layer 1013, a second electrode Erl, and an encapsulation film 1014, but the embodiments of the present disclosure are not limited thereto. For example, the encapsulation film 1014 may not be included in the light emitting device ED.

The first semiconductor layer 1011 can be disposed on the solder pattern SDP. The second semiconductor layer 1013 can be disposed on the first semiconductor layer 1011.

For example, one of the first semiconductor layer 1011 and the second semiconductor layer 1013 can be implemented as a compound semiconductor of group III-V, group II-VI, and can be doped with an impurity (or dopant). For example, one of the first semiconductor layer 1011 and the second semiconductor layer 1013 can be a semiconductor layer doped with an n-type impurity, and the other can be a semiconductor layer doped with a p-type impurity, but the embodiments of the present disclosure are not limited thereto. For example, at least one of the first semiconductor layer 1011 and the second semiconductor layer 1013 can be a layer doped with an n-type or p-type impurity in a material such as gallium nitride (GaN), gallium phosphide (GaP), gallium arsenide phosphide (GaAsP), aluminum gallium indium phosphide (AlGaInP), indium aluminum phosphide (InAlP), aluminum gallium nitride (AlGaN), aluminum indium nitride (AlInN), aluminum indium gallium nitride (AlInGaN), aluminum gallium arsenide (AlGaAs), or gallium arsenide (GaAs), but the embodiments of the present disclosure are not limited thereto. For example, the n-type impurity can be silicon (Si), germanium (Ge), selenium (Se), carbon (C), tellurium (Te), or tin (Sn), but the embodiments of the present disclosure are not limited thereto. For example, the p-type impurity can be magnesium (Mg), zinc (Zn), calcium (Ca), strontium (Sr), barium (Ba), or beryllium (Be), but the embodiments of the present disclosure are not limited thereto.

For example, the first semiconductor layer 1011 and the second semiconductor layer 1013 can be a nitride semiconductor including an n-type impurity and a nitride semiconductor including a p-type impurity, respectively, but the embodiments of the present disclosure are not limited thereto. For example, the first semiconductor layer 1011 can be a nitride semiconductor containing a p-type impurity, and the second semiconductor layer 1013 can be a nitride semiconductor containing an n-type impurity, but the embodiments of the present disclosure are not limited thereto.

The active layer 1012 can be arranged between the first semiconductor layer 1011 and the second semiconductor layer 1013. The active layer 1012 can receive holes and electrons from the first semiconductor layer 1011 and the second semiconductor layer 1013 to emit light. For example, the active layer 1012 can be configured as one of a single well structure, a multi-well structure, a single quantum well structure, a multi-quantum well (MQW) structure, a quantum dot structure, and a quantum wire structure, but the embodiments of the present disclosure are not limited thereto. For example, the active layer 1012 can be configured as indium gallium nitride (InGaN) or gallium nitride (GaN), but the embodiments of the present disclosure are not limited thereto.

For another example, the active layer 1012 can include a multi-quantum well (MQW) structure having a well layer and a barrier layer having a higher band gap than the well layer. For example, the active layer 1012 can be formed of InGaN as a well layer and an AlGaN layer as a barrier layer, but the embodiments of the present disclosure are not limited thereto.

The first electrode Ecl of the light emitting device ED can be arranged between the first semiconductor layer 1011 and the solder pattern SDP. For example, the first electrode Ecl of the light emitting device ED can electrically connect the first semiconductor layer 1011 and the column connection electrode CCE. The column line voltage (e.g., the anode voltage) output from the driver DRV can be applied to the first semiconductor layer 1011 through the column line CL, the column connection electrode CCE, and the first electrode Ecl. For example, the first electrode Ecl can be composed of a conductive material capable of eutectic bonding with the solder pattern SDP, but the embodiments of the present disclosure are not limited thereto. For example, the first electrode Ecl of the light emitting device ED can be composed of gold (Au), tin (Sn), tungsten (W), silicon (Si), silver (Ag), titanium (Ti), iridium (Ir), chromium (Cr), indium (In), zinc (Zn), lead (Pb), nickel (Ni), platinum (Pt), and copper (Cu), or an alloy thereof, but the embodiments of the present disclosure are not limited thereto.

The second electrode Erl of the light emitting device ED can be disposed on the second semiconductor layer 1013. For example, the second electrode Erl of the light emitting device ED can electrically connect the second semiconductor layer 1013 and the row line RL. A row line voltage (e.g., referred to as a low-potential voltage VSS as a cathode voltage) output from the driver DRV can be applied to the second semiconductor layer 1013 through the row connection electrode RCE, the row line RL, and the second electrode Erl. The second electrode Erl of the light emitting device ED can be made of a transparent conductive material so that light emitted from the light emitting device ED can be directed to the upper portion of the light emitting device ED, but the embodiments of the present disclosure are not limited thereto. For example, the second electrode Erl can be made of a material such as indium tin oxide (ITO), indium zinc oxide (IZO), or indium gallium zinc oxide (IGZO), but the embodiments of the present disclosure are not limited thereto.

The encapsulation film 1014 can be disposed on at least a portion of the first semiconductor layer 1011, the active layer 1012, the second semiconductor layer 1013, the first electrode Ecl, and the second electrode Erl. For example, the encapsulation film 1014 can surround at least a portion of the first semiconductor layer 1011, the active layer 1012, the second semiconductor layer 1013, the first electrode Ecl, and the second electrode Erl.

For example, the encapsulation film 1014 can protect the first semiconductor layer 1011, the active layer 1012, and the second semiconductor layer 1013. For example, the encapsulation film 1014 can be disposed on a side surface of the first semiconductor layer 1011, a side surface of the active layer 1012, and a side surface of the second semiconductor layer 1013.

For example, the encapsulation film 1014 can be disposed on at least a portion of the first electrode Ecl and the second electrode Erl of the light emitting device ED. For example, the encapsulation film 1014 can be disposed on an edge portion (or one side) of the first electrode Ecl of the light emitting device ED and an edge portion (or one side) of the second electrode Erl of the light emitting device ED. At least a portion of the first electrode Ecl can be exposed from the encapsulation film 1014 so that the first electrode Ecl can be connected to the solder pattern SDP. For example, at least a portion of the second electrode Erl can be exposed from the encapsulation film 1014 so that the second electrode Erl can be connected to the row line RL. For example, the encapsulation film 1014 can be made of an insulating material such as silicon nitride (SiNx) or silicon oxide (SiOx), but the embodiments of the present disclosure are not limited thereto.

For another example, the encapsulation film 1014 can have a structure in which a reflective material is dispersed in a resin layer, but the embodiments of the present disclosure are not limited thereto. For example, the encapsulation film 1014 can be manufactured as a reflector of various structures, but the embodiments of the present disclosure are not limited thereto. Light emitted from the active layer 1012 can be reflected upward by the encapsulation film 1014, thereby improving light extraction efficiency. For example, the encapsulation film 1014 can be a reflective layer, but the embodiments of the present disclosure are not limited thereto.

According to the embodiments of the present disclosure, the light emitting device ED is described as having a vertical structure, but the embodiments of the present disclosure are not limited thereto. For example, the light emitting device ED can have a lateral structure or a flip chip structure.

The structure of the light emitting device ED illustrated in FIG. 10 can be substantially equally applied to all of the first light emitting device EDa, the second light emitting device EDb, and the third light emitting device EDc. According to embodiments of the present disclosure, a first optical layer 917*a* can be arranged to surround a plurality of light emitting devices ED in the display area DA. For example, the first optical layer 917*a* can be arranged to cover a plurality of light emitting devices ED and the bank BNK in the area of a plurality of sub-pixels SP. For example, the first optical layer 917*a* can cover a bank BNK, a portion of the passivation layer 916, and a region between the plurality of light emitting devices ED. The first optical layer 917*a* can be arranged or covered between a plurality of light emitting devices ED included in one pixel and between a plurality of banks BNK. For example, the first optical layer 917*a* can be arranged to extend in the first direction (X) and be spaced apart from each other in the second direction (Y). For example, the first optical layer 917*a* can be arranged to surround the side of the light emitting devices ED and the banks BNK between the passivation layer 916 and the row line RL, but the embodiments of the present disclosure are not limited thereto. For example, the first optical layer 917*a* can be a diffusion layer or a sidewall diffusion layer, but the embodiments of the present disclosure are not limited thereto.

The first optical layer 917*a* can include an organic insulating material having fine particles dispersed therein, but the embodiments of the present disclosure are not limited thereto. For example, the first optical layer 917*a* can be composed of siloxane having fine metal particles, such as titanium dioxide ($TiO2$) particles, dispersed therein, but the embodiments of the present disclosure are not limited thereto. Light from a plurality of light emitting devices ED can be scattered by the fine particles dispersed in the first optical layer 917*a* and emitted to the outside of the display device 100. Accordingly, the first optical layer 917*a* can improve the extraction efficiency of light emitted from the plurality of light emitting devices ED.

For example, the first optical layer 917*a* can be arranged on each of a plurality of pixels, or can be arranged together on some pixels arranged in the same row, but the embodiments of the present disclosure are not limited thereto. For example, the first optical layer 917*a* can be arranged on each of a plurality of pixels, or the plurality of pixels can share one first optical layer 917*a*. For another example, each of the plurality of sub-pixels can separately include a first optical layer 917*a*, but the embodiments of the present disclosure are not limited thereto.

According to the embodiments of the present disclosure, in the display area DA, a second optical layer 917*b* can be arranged on the passivation layer 916. For example, the second optical layer 917*b* can be arranged to surround the first optical layer 917*a*. For example, the second optical layer 917*b* can be in contact with a side surface of the first optical layer 917*a*. For example, the second optical layer 917*b* can be arranged in an area between the plurality of pixels. However, the embodiments of the present disclosure are not limited thereto. For example, the second optical layer 917*b* can be a diffusion layer, a diffusion layer window, or a window diffusion layer, but the embodiments of the present disclosure are not limited thereto.

The second optical layer 917*b* can be composed of an organic insulating material, but the embodiments of the present disclosure are not limited thereto. The second optical layer 917*b* can be composed of the same material as the first optical layer 917*a*, but the embodiments of the present disclosure are not limited thereto. For example, the first optical layer 917*a* can include fine particles, and the second optical layer 917*b* may not include fine particles. For example, the second optical layer 917*b* can be composed of siloxane, but the embodiments of the present disclosure are not limited thereto.

For example, the thickness of the first optical layer 917*a* can be smaller than the thickness of the second optical layer 917*b*, but the embodiments of the present disclosure are not limited thereto. Accordingly, when viewed from a planar view, the area where the first optical layer 917*a* is disposed can include a concave portion that is sunken inwardly from the upper surface of the second optical layer 917*b*.

According to the embodiments of the present disclosure, a row line RL can be disposed on the first optical layer 917*a* and the second optical layer 917*b*. For example, the row line RL can be electrically connected to a plurality of row connection electrodes RCE through contact holes of the second optical layer 917*b*. For example, the row line RL can be disposed on a plurality of light emitting devices ED. For example, the row line RL can include a transparent conductive oxide such as indium tin oxide (ITO) or indium zinc oxide (IZO), but the embodiments of the present disclosure are not limited thereto. For example, the row line RL can be arranged to be in contact with the second electrode Erl of the light emitting device ED. For example, the row line RL can overlap with the first optical layer 917*a*. For example, the row line RL can cover a plane on the outside of the first optical layer 917*a*.

The row line RL can extend continuously in the first direction (X) of the substrate 210. Accordingly, the row line RL can be commonly connected to a plurality of pixels arranged in the first direction (X) of the substrate 210. For example, the row line RL can be commonly connected to a plurality of pixels.

According to the embodiments of the present disclosure, the row line RL can be continuously extended on the first optical layer 917*a*, the second optical layer 917*b*, and the light emitting device ED. The area where the first optical layer 917*a* is disposed can include a concave portion that is sunken inwardly from the upper surface of the second optical layer 917*b*. Accordingly, the first part of the row line RL disposed on the first optical layer 917*a* can be disposed along the concave portion, and thus can be disposed at a lower position than the second part of the row line RL disposed on the second optical layer 917*b*.

A third optical layer 917*c* can be disposed on the row line RL. The third optical layer 917*c* can be disposed so as to overlap with a plurality of light emitting devices ED and the first optical layer 917*a*. Since the third optical layer 917*c* is arranged on the row line RL and the plurality of light emitting devices ED, it is possible to improve a mura that can occur in some of the plurality of light emitting devices ED. For example, when transferring a plurality of light emitting devices ED onto the substrate 210 of the display panel 110, there can occur an area where the spacing between the plurality of light emitting devices ED is not uniform due to process deviation. If the spacing between the plurality of light emitting devices ED is not uniform, an emission area of each of the plurality of light emitting devices ED can be arranged unevenly, and thus a mura can be visible to the user. Accordingly, since the third optical layer 917*c* is arranged to uniformly diffuse light over the plurality of light emitting devices ED, it is possible to reduce light emitted from some of the light emitting devices ED from being visible as a mura. Accordingly, since the light emitted from the plurality of light emitting devices EDs is evenly diffused by the third optical layer 917*c* and extracted to the outside of the display device 100, the luminance uniformity of the display device 100 can be improved.

The third optical layer 917*c* can be composed of an organic insulating material in which fine particles are dispersed, but the embodiments of the present disclosure are not limited thereto. For example, the third optical layer 917*c* can be composed of siloxane in which fine metal particles such as titanium dioxide (TiO2) particles are dispersed, but the embodiments of the present disclosure are not limited thereto. For example, the third optical layer 917*c* can be composed of the same material as the first optical layer 917*a*, but the embodiments of the present disclosure are not limited thereto. For example, the third optical layer 917*c* can be a diffusion layer or an upper diffusion layer, but the embodiments of the present disclosure are not limited thereto.

According to the embodiments of the present disclosure, light from a plurality of light emitting devices ED can be scattered by fine particles dispersed in a third optical layer 917*c* and emitted to the outside of the display device 100. The third optical layer 917*c* can evenly mix light emitted from a plurality of light emitting devices ED, thereby further improving the luminance uniformity of the display device 100. In addition, the light extraction efficiency of the display device 100 can be improved by the light scattered from the plurality of fine particles, thereby enabling the display device 100 to be driven at low power.

A black matrix BM can be arranged on the row line RL, the first optical layer 917*a*, the second optical layer 917*b*, and the third optical layer 917*c* in the display area DA. For example, the black matrix BM can fill a contact hole of the second optical layer 917*b*. The black matrix BM can be configured to cover the display area DA, so that the color mixing of light and external light reflection of the plurality of sub-pixels can be reduced. For example, the black matrix BM can also be arranged in the contact hole where the row line RL and the row connection electrode RCE are connected, so that light leakage between the neighboring plurality of sub-pixels can be prevented.

For example, the black matrix BM can be composed of an opaque material, but the embodiments of the present disclosure are not limited thereto. For example, the black matrix BM can be an organic insulating material to which a black pigment or a black dye is added, but the embodiments of the present disclosure are not limited thereto.

A cover layer 918 can be arranged on the black matrix BM in the display area DA. The cover layer 918 can protect a configuration under the cover layer 918. For example, the cover layer 918 can be composed of an organic insulating material, but the embodiments of the present disclosure are not limited thereto. For example, the cover layer 918 can be composed of a photo resist, polyimide (PI), or photo acryl-based material, but the embodiments of the present disclosure are not limited thereto. For example, the cover layer 918 can be an overcoating layer or an insulating layer, but the embodiments of the present disclosure are not limited thereto.

A polarizing layer 114 can be arranged on the cover layer 918 via a first adhesive layer 112. A cover member 118 can be arranged on the polarizing layer 114 via a second adhesive layer 116. For example, the first adhesive layer 112 and the second adhesive layer 116 can include an optically clear adhesive (OCA), an optically clear resin (OCR), or a pressure sensitive adhesive (PSA), but the embodiments of the present disclosure are not limited thereto.

According to embodiments of the present disclosure, a plurality of pads PD can be arranged on a third insulating layer 915*c* in a second non-display area NDA2. For example, at least a portion of the plurality of pads PD can be exposed from a passivation layer 916. For example, the plurality of pads PD can be electrically connected to a fourth pad connection pattern PCP4 through a contact hole of the third insulating layer 915*c*.

An adhesive layer ACF can be arranged on the plurality of pads PD. The adhesive layer ACF can be an adhesive layer in which conductive balls are dispersed in an insulating material, but embodiments of the present disclosure are not limited thereto. When heat or pressure is applied to the adhesive layer ACF, the conductive balls can be electrically connected at a portion where the heat or pressure is applied, thereby having conductive properties. The adhesive layer ACF can be disposed between a plurality of pads PD and a flexible printed circuit 102, so that the flexible printed circuit 102 can be attached or bonded to the plurality of pads PD. For example, the adhesive layer ACF can be an anisotropic conductive film ACF, but the embodiments of the present disclosure are not limited thereto.

A flexible printed circuit 102 can be disposed on the adhesive layer ACF. The flexible printed circuit 102 can be electrically connected to the plurality of pads PD through the adhesive layer ACF. Accordingly, a signal supplied from the flexible printed circuit 102 can be transmitted to a driver DRV of a display area DA through the plurality of pads PD, the fourth pad connection pattern PCP4, the third pad connection pattern PCP3, the second pad connection pattern PCP2, and the first pad connection pattern PCP1.

Referring to FIG. 9, the display panel 110 according to the embodiments of the present disclosure can include a substrate 210, a layer stack on a plurality of drivers DRV disposed on the substrate 210, an optical layer 917*a* disposed between a plurality of light emitting devices EDa, EDb and EDc on the layer stack, an adhesive layer 116 disposed on the plurality of light emitting devices EDa, EDb and EDc and the optical layer 917*a*, and a cover member 118 disposed on the adhesive layer 116.

A plurality of column lines CL can be disposed between the layer stack and the plurality of light emitting devices EDa, EDb and EDc.

A plurality of row lines RL can be arranged on a plurality of light emitting devices EDa, EDb and EDc and an optical layer 917*a*. A plurality of row lines RL can be arranged between a plurality of light emitting devices EDa, EDb and EDc, an optical layer 917*a*, and an adhesive layer 116.

A layer stack can include a plurality of protection layers 913*a*, 913*b* and 914 arranged on the side and upper surface of each of a plurality of drivers DRV, a plurality of insulating layers 915*a*, 915*b* and 915*c* arranged on the plurality of protection layers 913*a*, 913*b* and 914, and a bank BNK arranged on the plurality of insulating layers.

The side protection layer 913 disposed on each side of the plurality of drivers DRV can include a first protection layer 913*a* disposed on the substrate 210 and a second protection layer 913*b* disposed on the first protection layer 913*a*.

The upper protection layer 914 disposed on the upper surface of each of the plurality of drivers DR can include a third protection layer 914 disposed on the plurality of drivers DRV and the second protection layer 913*b*.

The plurality of insulating layers 915*a*, 915*b* and 915*c* can include a first insulating layer 915*a* disposed on the upper protection layer 914, and a second insulating layer 915*b* disposed on the first insulating layer 915*a*. The plurality of insulating layers 915*a*, 915*b* and 915*c* can further include a third insulating layer 915*c* disposed on the second insulating layer 915*b*.

Each of the plurality of light emitting devices EDa, EDb and EDc can be disposed on the bank BNK and positioned in an opening of the optical layer 917*a*.

At least a portion of each of the plurality of column lines CL can extend onto the bank BNK on the plurality of insulating layers 915*a*, 915*b* and 915*c*. Each of the plurality of row lines RL can be arranged on the optical layer 917*a* and the plurality of light emitting devices EDa, EDb and EDc.

A first electrode Ecl of each of the plurality of light emitting devices EDa, EDb and EDc can be electrically connected to at least a portion of a column line CL extending onto the bank BNK among the plurality of column lines CL. A second electrode Erl of each of the plurality of light emitting devices EDa, EDb and EDc can be electrically connected to one of the plurality of row lines RL.

The display panel 110 according to the embodiments of the present disclosure can include a plurality of line connection patterns LCPs that connect each of a plurality of lines including a plurality of row lines RL and a plurality of column lines CL to a plurality of drivers DR.

The plurality of line connection patterns LCPs can include a first line connection pattern LCP1 disposed on a side protection layer 913, a second line connection pattern LCP2 disposed on an upper protection layer 914 and electrically connected to the first line connection pattern LCP1 through a hole in the upper protection layer 914, a third line connection pattern LCP3 disposed on a first insulating layer 915*a* and electrically connected to the second line connection pattern LCP2 through a hole in the first insulating layer 915*a*, and a fourth line connection pattern LCP4 disposed on a second insulating layer 915*b* and electrically connected to the third line connection pattern LCP3 through a hole in the second insulating layer 915*b*.

The first line connection pattern LCP1 can be electrically connected to one of the plurality of drivers DRV. The fourth line connection pattern LCP4 can be electrically connected to at least one second electrode Erl of the plurality of light emitting devices EDa, EDb and EDc, or can be electrically connected to at least one first electrode Ecl of the plurality of light emitting devices EDa, EDb and EDc.

The side protection layer 913 arranged on each side of the plurality of drivers DRV can include two or more organic layers.

The first and second protection layers 913*a* and 913*b* as the side protection layer 913, the third protection layer 914 as the upper protection layer 914, and the first to third insulating layers 915*a*, 915*b* and 915*c* can each be composed of organic layers.

Figure 12:
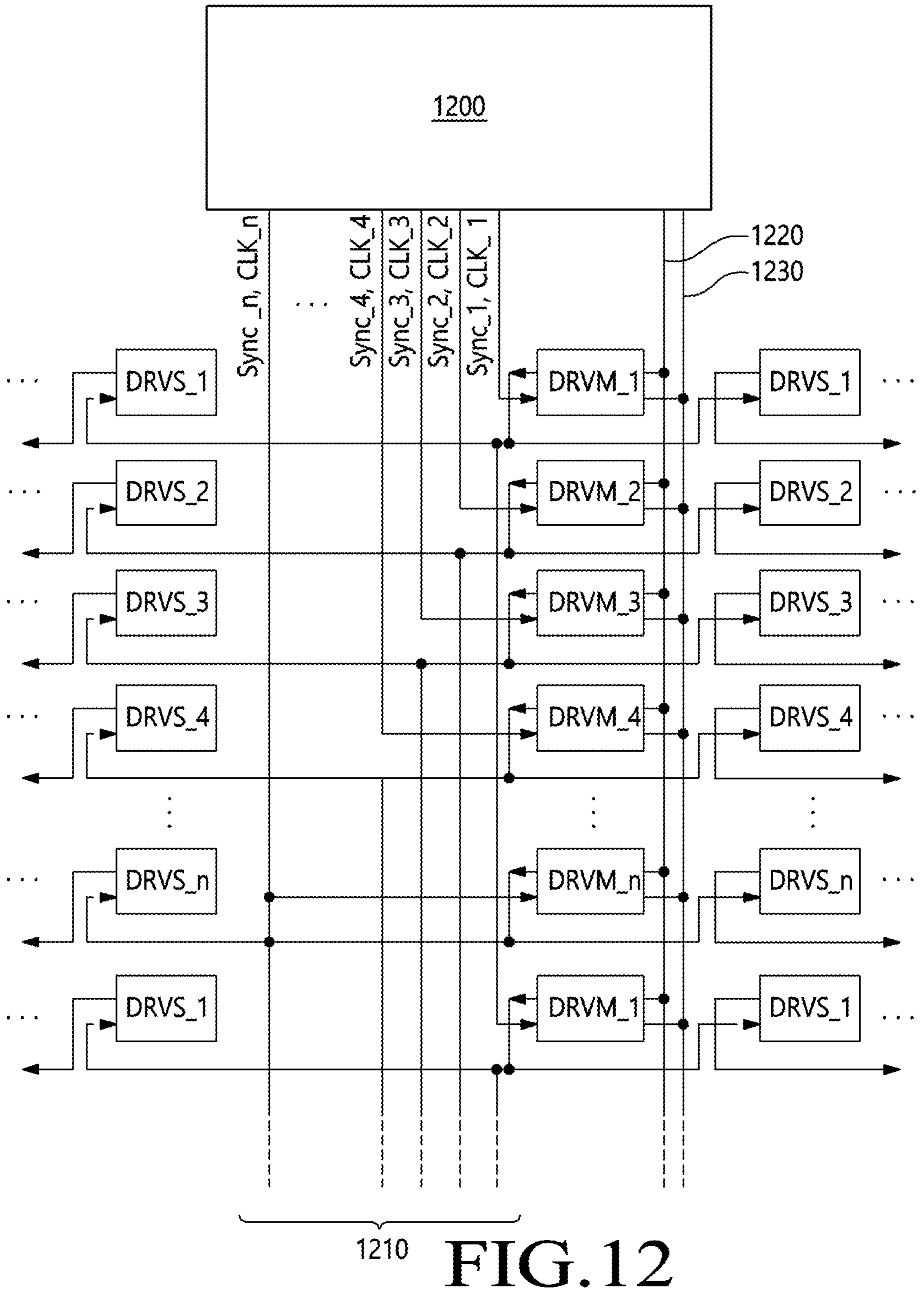

FIG. 11 and FIG. 12 are drawings for explaining a driver DRV equipped in a display device 100 according to embodiments of the present disclosure.

Specifically, FIG. 11 illustrates a plan view in which a plurality of drivers DRV are disposed in a display panel 110 according to embodiments of the present disclosure, and FIG. 12 illustrates a plan view for further explaining a main driver DRVM among a plurality of drivers DRV disposed in a display panel 110 according to embodiments of the present disclosure.

Referring to FIG. 11, a plurality of drivers DRV can be disposed in a display panel 110 according to embodiments of the present disclosure, and the plurality of drivers DRV can include a plurality of main drivers DRVM and a plurality of sub-drivers DRVS connected to each of the plurality of main drivers DRVM.

A plurality of main drivers DRVM and a plurality of sub-drivers DRVS corresponding to each of the main drivers DRVM can be grouped into at least one driver group DRV_G.

Although only three driver groups DRV_G are illustrated in FIG. 11, the embodiments of the present disclosure are not limited thereto, and a plurality of main drivers DRVM and a plurality of sub-drivers DRVS can be grouped into two or fewer or four or more driver groups DRV_G.

According to the example of FIG. 11, in each of the driver groups DRV_G, M (where M is a positive integer greater than or equal to 2) main drivers DRVM can be arranged in one column, and a plurality of sub-drivers DRVS corresponding to each of the M main drivers DRVM arranged in one column can be connected.

For example, in each driver group DRV_G, the first to M-th main drivers DRVM_1 to DRVM_M can be disposed in one column.

The driver group DRV_G can be divided into k sub-groups (where k is a positive integer), and in the example of FIG. 11, only three sub-groups DRV_SG1, DRV_SG2 and DRV_SG3 are illustrated for convenience of explanation, but the embodiments of the present disclosure are not limited thereto, and one driver group DRV_G can be composed of two or less or four or more sub-groups.

Each of the sub-groups DRV_SG1, DRV_SG2 and DRV_SG3 can include the first to n-th main drivers (where n is a positive integer of 2 or more, where $n \le N$) that receive a synchronization signal and a clock signal having different phases.

For example, the number N of main drivers DRVM arranged in one column can be $k \times n$. According to the example of FIG. 11, since k=3 and n=6, a total of 18 main drivers DRVM can be disposed in one column.

Referring to FIG. 12, in the display panel 110 according to the embodiments of the present disclosure, a plurality of drivers DRV can be disposed for each row, and here, the number of drivers DRV disposed can be variably adjusted according to the size of the display panel or the number of pixels allocated to each driver DRV.

A timing controller 1200 can process image data RGB input from the outside appropriately for the size and resolution of the display panel 110, and supply the processed data to each of the plurality of drivers DRV. The timing controller 220 can generate a control signal for controlling the operation of each of the plurality of drivers DRV using externally input synchronous signals, for example, a dot clock signal CLK, a data enable signal DE, a horizontal synchronization signal Hsync, and a vertical synchronization signal Vsync, and can supply the generated control signal to each of the plurality of drivers DRV arranged in each row.

The plurality of drivers DRV can include a plurality of main drivers DRVM that receive a control signal from the timing controller 1200, and a plurality of sub-drivers DRVS that are electrically connected to a corresponding one of the plurality of main drivers DRVM and control the light-emitting operation of a corresponding pixel among the plurality of pixels P according to the control signal.

For example, in a first row, there can be disposed a first main driver DRVM_1 electrically connected to the timing controller 1200 and receiving a control signal, and at least one first sub-driver DRVS_1 electrically connected to the first main driver DRVM_1.

In a second row, a second main driver DRVM_2 electrically connected to the timing controller 1200 and receiving a control signal, and at least one second sub-driver DRVS_2 electrically connected to the second main driver DRVM_2 can be disposed.

In a third row, a third main driver DRVM_3 electrically connected to the timing controller 1200 and receiving a control signal, and at least one third sub-driver DRVS_3 electrically connected to the third main driver DRVM_3 can be disposed.

In a fourth row, a fourth main driver DRVM_4 electrically connected to the timing controller 1200 and receiving a control signal, and at least one fourth sub-driver DRVS_4 electrically connected to the third main driver DRVM_4 can be disposed.

In a n-th row, an n-th main driver DRVM_n electrically connected to the timing controller 1200 and receiving a control signal, and at least one n-th sub-driver DRVS_n electrically connected to the n-th main driver DRVM_n can be disposed.

Each of the main drivers DRVM_1 to DRVM_n can be electrically connected to the timing controller 1200 through at least one first signal line 1210, a second signal line 1220, and a third signal line 1230.

Each of the main drivers DRVM_1 to DRVM_n can receive a synchronization signal and a clock signal from the timing controller 1200 through at least one first signal line 1210.

Specifically, each of the plurality of drivers DRV can drive a light emitting device (e.g., micro LED) connected to each of the plurality of drivers DRV. However, in order to prevent the occurrence of a peak current exceeding a threshold value, instead of driving all of the light emitting devices simultaneously, the light emitting devices can be grouped into n groups, and the operation of each group can be controlled with a time difference.

To this end, each of the at least one first signal lines 1210 can include n clock signal lines CLK_1 to CLK_n and n synchronization signal lines Sync_1 to Sync_n having different phases.

For example, in a normal mode, the timing controller 1200 can provide synchronization signals of the first to n-th phases through n synchronization signal lines Sync_1 to Sync_n, and can provide phase image data CLK_R/G/B of the first to n-th phases through n clock signal lines CLK_1 to CLK_n.

Here, the synchronization signal can be a signal that serves as a reference for the emission timing of the light emitting device, and the phase image data can refer to a signal that serves as a reference for generating a light-emitting pulse.

For example, the second signal line 1220 can be one of the first to fourth data lines through which the timing controller 1200 outputs image data of R/G/B in the normal mode, and the third signal line 1230 can be a data clock line through which the timing controller 1200 outputs a recovery clock in the normal mode.

According to the example of FIG. 12, the first main driver DRVM_1 can be connected to a first synchronization signal line Sync_1 and a first clock signal line CLK_1, and the second main driver DRVM_2 can be connected to a second synchronization signal line Sync_2 and a second clock signal line CLK_2.

The third main driver DRVM_3 can be connected to a third synchronization signal line Sync_3 and a third clock signal line CLK_3, and the fourth main driver DRVM_4 can be connected to a fourth synchronization signal line Sync_4 and a fourth clock signal line CLK_4.

The n-th main driver DRVM_n can be connected to a n-th synchronization signal line Sync_n and a n-th clock signal line CLK_n.

Referring to FIG. 11 and FIG. 12, the first main driver DRVM_1 provided in each of the sub-groups DRV_SG1, DRV_SG2 and DRV_SG3 can be connected to the same first synchronization signal line Sync_1 and first clock signal line CLK_1, and the n-th main driver DRVM_n provided in each of the sub-groups DRV_SG1, DRV_SG2 and DRV_SG3 can be connected to the same n-th synchronization signal line Sync_n and n-th clock signal line CLK_n.

Meanwhile, in the display device 100 according to the embodiments of the present disclosure, as illustrated in FIG. 6, as the bending area BA is bent, a portion of a plurality of link lines LL connected to at least one of the first to third signal lines 1210, 1220 and 1230 can also be bent together. Accordingly, stress can be concentrated on a part of the bent link line LL, and a crack (i.e., a bending crack) can occur in the link line LL, which can cause a wiring defect in the signal line.

In addition, the display device 100 can have a line defect in at least one first signal line 1210.

Accordingly, the display device 100 according to the embodiments of the present disclosure can detect and repair the line defect described above through a test mode. Furthermore, the display device 100 can detect and repair the line defect by utilizing the existing arranged lines and pads without adding separate wiring or pads, thereby minimizing the increased cost and time needed for the test.

For example, the test mode can be performed in the module inspection stage, but the embodiments of the present disclosure are not limited thereto.

The timing controller 1200 can provide a test pulse to at least two main drivers DRVM among the plurality of main drivers DRVM through at least one first signal line 1210 in the test mode.

For example, the test pulse can be a single pulse, and each of the main drivers DRVM can receive the same test pulse through at least one first signal line 1210.

The timing controller 1200 can receive a test output signal based on a test output pulse output at different timings from each of the two or more main drivers DRVM that received the test pulse through the second signal line 1220, and can determine whether a line has a defect and/or a defect position based on the test output signal received through the second signal line 1220.

For example, if the first to M-th main drivers DRVM_1 to DRVM_M are disposed in one column, the timing controller 1200 can provide a test pulse to the first to M-th main drivers DRVM_1 to DRVM_M and receive a test output signal including a test output pulse output at different timings from the first to M-th main drivers DRVM_1 to DRVM_M through the second signal line 1220, thereby determining whether a line has a defect due to a bending crack and/or a line defect of the first signal line 1210 itself, and detect the location of occurrence of the defect.

In addition, if the first to M-th main drivers DRVM_1 to DRVM_M are disposed in one column, the timing controller 1200 can provide a test pulse to the first to n-th drivers DRVM_1 to DRVM_n arranged in the closest sub-group (e.g., the first sub-group DRV_SG1) from the timing controller 1200, and can receive a test output signal based on the test output pulses output at different timings from the first to n-th drivers DRVM_1 to DRVM_n through the second signal line 1220, thereby determining whether a line defect occurs due to a bending crack.

For a more specific example, when the timing controller 1200 provides a test pulse to the first to M-th main drivers, the timing controller 1200 can receive a test output signal including a test output pulse output from the first main driver DRVM_1 at a first timing, a test output pulse output from the second main driver DRVM_2 at a second timing, and a test output pulse output from the M-th main driver DRVM_M at an M-th timing.

Further, when the timing controller 1200 provides a test pulse to the first to n-th main drivers, the timing controller 1200 can receive a test output signal including a test output pulse output from the first main driver DRVM_1 at a first timing, a test output pulse output from the second main driver DRVM_2 at a second timing, and a test output pulse output from the n-th main driver DRVM_n at an n-th timing.

Figure 13:
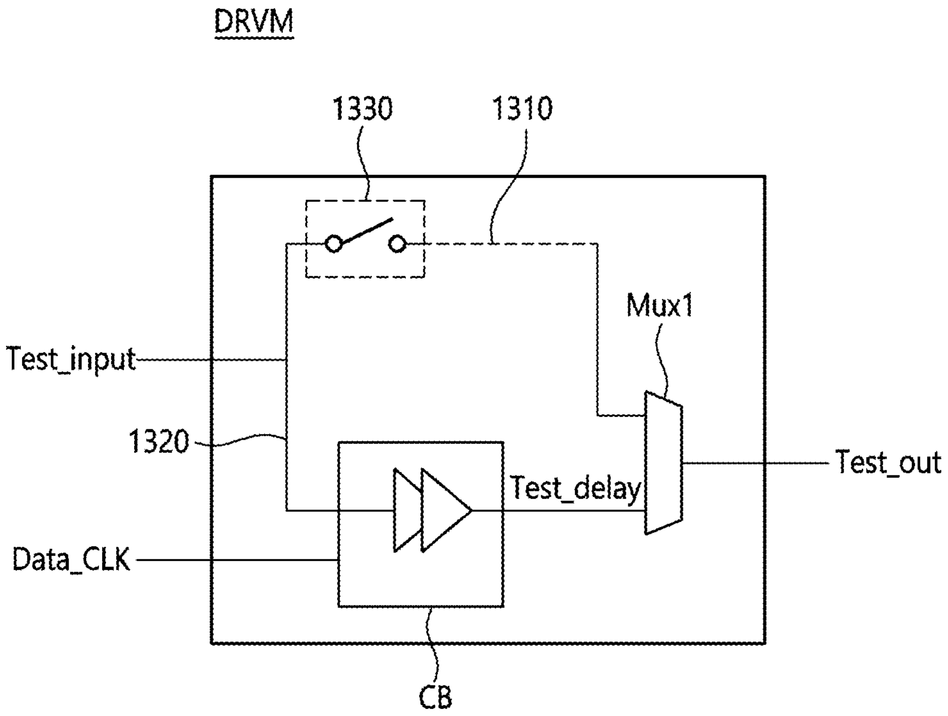
FIGS. 13 and 14 are diagrams for specifically explaining a main driver provided in a display device according to embodiments of the present disclosure.
Figure 14:
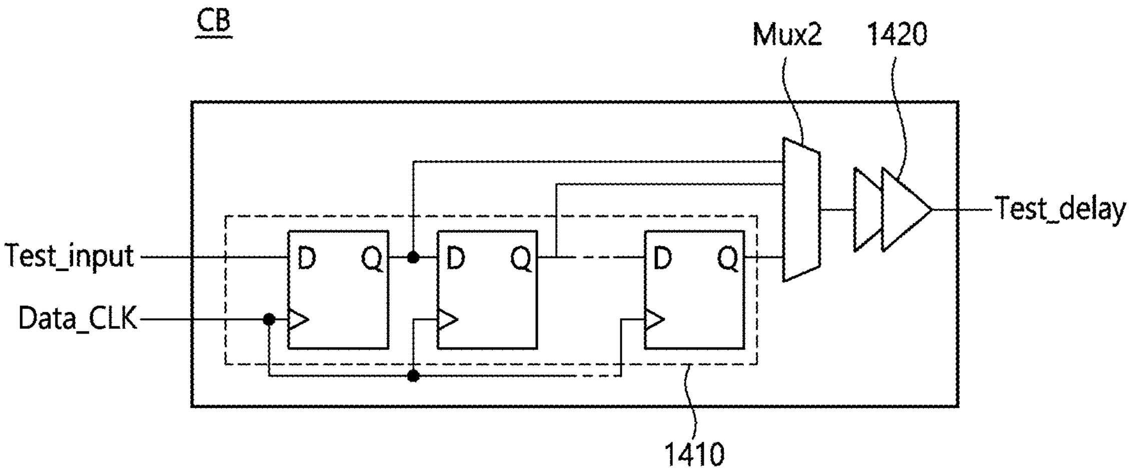

FIG. 13 and FIG. 14 are diagrams specifically explaining a main driver DRVM equipped in a display device 100 according to embodiments of the present disclosure.

Specifically, FIG. 13 exemplifies a main driver DRVM equipped in a display device 100 according to embodiments of the present disclosure, and FIG. 14 is a diagram for further explaining a clock buffer CB equipped in the main driver DRVM.

Referring to FIG. 13, each of a plurality of main drivers DRVM can include a clock buffer CB and a first multiplexer Mux1 electrically connected to the clock buffer CB.

Each of the plurality of main drivers DRVM can further include a switching element 1330 that controls the connection between an input terminal of the main driver DRVM and a general path 1310.

For example, the switching element 1330 can be turned on in the normal mode to control the synchronization signal and clock signal provided from a corresponding one of the first signal lines 1210 to be transmitted to the general path 1310. The switching element 1330 can be turned off in the test mode to control the test pulse Test_input provided from a corresponding one of the first signal lines 1210 not to be transmitted to the general path 1310.

The clock buffer CB can be disposed on a test path 1320 to receive the test pulse Test_input from the timing controller 1200 and delay the test pulse Test_input. The clock buffer CB can receive a reference clock signal Data_CLK through the third signal line 1230 in the test mode and delay the test pulse Test_input.

The first multiplexer Mux1 can output the delayed test pulse Test_delay as a test output pulse Test_out through the clock buffer CB.

For example, the clock buffer CB disposed in the first main driver DRVM_1 can delay the test pulse Test_input, so that the test output pulse Test_out can be output at the first timing.

Further, the clock buffer CB disposed in the second main driver DRVM_2 can delay the test pulse Test_input so as for the test output pulse Test_out to be output at the second timing.

Furthermore, the clock buffer CB disposed in the n-th main driver DRVM_n can delay the test pulse Test_input, and output the test output pulse Test_out at the n-th timing.

In addition, the clock buffer CB disposed in the M-th main driver can delay the test pulse Test_input, and output the test output pulse Test_out at the M-th timing.

Referring to FIG. 14, the clock buffer CB provided in each of the plurality of main drivers DRVM can include at least one D-flip-flop 1410, and can delay the test pulse Test_input using at least one D-flip-flop 1410.

For example, at least two main drivers DRVM that receive test pulses Test_input from the timing controller 1200 can include different numbers of D-flip-flops 1410 to provide test output pulses Test_out at different timings.

For example, a clock buffer CB disposed in a first main driver DRVM_1 can include one D-flip-flop to output a test output pulse Test_out at a first timing, a clock buffer CB arranged in a second main driver DRVM_2 can include two D-flip-flops to output a test output pulse Test_out at a second timing, a clock buffer CB arranged in an n-th main driver DRVM_n can include n D-flip-flops to output a test output pulse Test_out at an n-th timing, and a clock buffer CB arranged in an M-th main driver can include M D-flip-flops to output a test output pulse Test_out at an M-th timing.

Meanwhile, the clock buffer CB can include a second multiplexer Mux2 connected to an output terminal of at least one D-flip-flop 1410 to control the delay amount of a test pulse Test_input by at least one D-flip-flop 1410, and a buffer circuit 1420 connected to an output terminal of the second multiplexer Mux2 to amplify and/or stabilize a signal output from the second multiplexer Mux2.

If the clock buffer CB includes the second multiplexer Mux2, each of the plurality of main drivers DRVM can have the same number of D-flip-flops.

For example, the second multiplexer 1420 arranged in the first main driver DRVM_1 can provide a delayed test pulse Test_delay output through an output terminal (e.g., Q terminal) of a first D-flip-flop 1410 so that the test output pulse Test_out is output at the first timing.

Further, the second multiplexer 1420 arranged in the n-th main driver DRVM_n can provide a delayed test pulse Test_delay output through an output terminal (e.g., Q terminal) of the n-th D-flip-flop 1410 so that the test output pulse Test_out is output at the n-th timing.

In addition, the second multiplexer 1420 arranged in the M-th main driver can provide a delayed test pulse Test_delay output through a Q terminal of the M-th D-flip-flop 1410 so that the test output pulse Test_out is output at the M-th timing.

Figure 15:
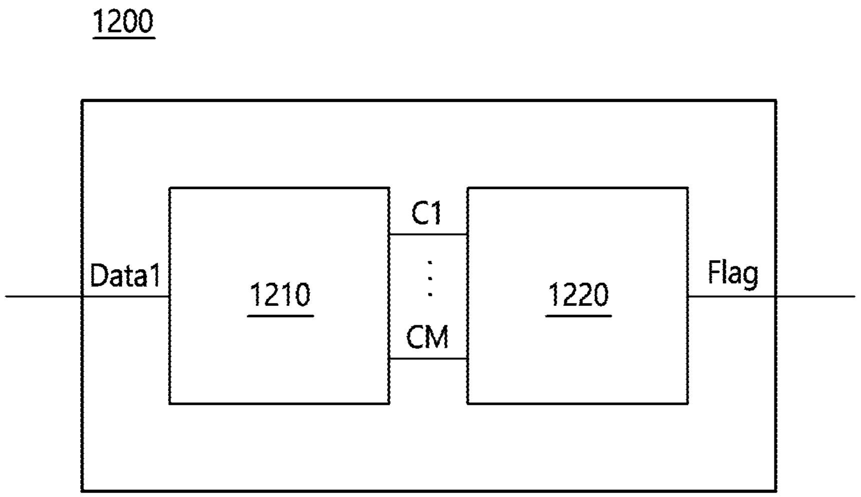
FIGS. 15 to 17 are diagrams for explaining an example of detecting a line defect in a timing controller provided in a display device according to embodiments of the present disclosure.
Figure 16:
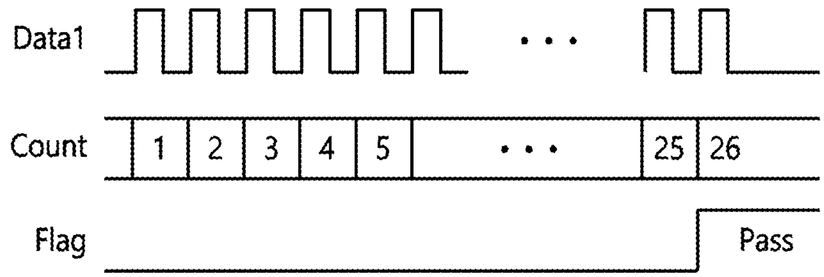
Figure 17:
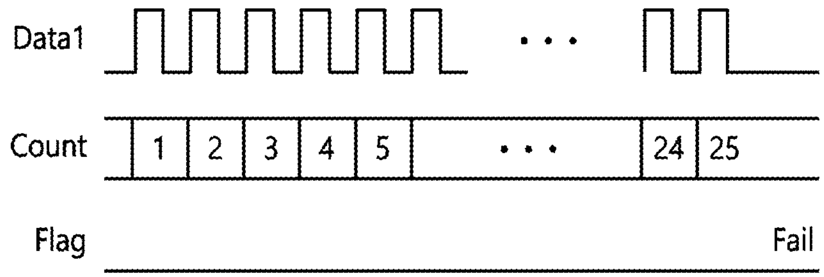

FIGS. 15 to 17 are diagrams for explaining an example of detecting a line defect in a timing controller 1200 provided in a display device 100 according to embodiments of the present disclosure.

Specifically, FIG. 15 illustrates an implementation example of a timing controller 1200 including circuits for determining a line defect, and FIGS. 16 and 17 illustrate timing diagrams for determining whether a line defect exists in the timing controller 1200.

Referring to FIG. 15, the timing controller 1200 according to the embodiments of the present disclosure can receive a test output signal Data1 through a second signal line 1220, count the number of pulses of the test output signal, and determine a line defect of a plurality of main drivers DRVM based on the counted number of pulses. To this end, the timing controller can include a counting circuit 1210 and a defect determination circuit 1220.

According to the example of FIG. 15, the second signal line 1220 can be a first data line, but the embodiments of the present disclosure are not limited thereto.

The counting circuit 1210 can count each of the plurality of test output pulses Test_out included in the test output signal Data1.

For example, the test output signal Data1 can include at least one of the test output pulses Test_out output from the first to M-th main drivers DRVM_1 to DRVM_M arranged in the same column.

In addition, the test output signal can include at least one of the test output pulses Test_out output from the first to n-th main drivers DRVM_1 to DRVM_n arranged at the closest position to the timing controller 1200 among the first to M-th main drivers DRVM_1 to DRVM_M.

However, the embodiments of the present disclosure are not limited thereto, and the test output signal Data1 can include test output pulses Test_out provided from the first to (M−1)-th main drivers.

Hereinafter, for convenience of explanation, it is exemplified that the test output signal includes at least one of the test output pulses Test_out output from the first to M-th main drivers DRVM_1 to DRVM_M.

The counting circuit 1210 can count a plurality of test output pulses Test_out included in the test output signal Data1 for a preset counting period.

For example, the preset counting period can be a first counting time C1 to a M-th counting time CM, but the embodiments of the present disclosure are not limited thereto.

The defect determination circuit 1220 can compare the counted number of pulses of the test output signal Data1 with a preset reference number, and determine whether the line is defective based on the result of the comparison.

For example, the reference number can be set to M if the test output signal Data1 is a signal corresponding to the first to M-th main drivers DRVM_1 to DRVM_M, and can be set to n if the test output signal is a signal corresponding to the first to n-th main drivers DRVM_1 to DRVM_n.

For example, the defect determination circuit 1220 can determine that a line defect has not occurred if the counted pulse number of the test output signal Data1 is equal to the reference number, and can determine that a line defect has occurred if the counted pulse number of the test output signal is less than the reference number.

According to the examples of FIGS. 16 and 17, the defect determination circuit 1220 can determine that a line defect has not occurred if the test output signal Data1 is a signal corresponding to the first to 26-th main drivers, and the counted number of pulses of the test output signal is 26, which is equal to the reference number of 26, and can output a pass flag as a result of the line defect determination.

The defect determination circuit 1220 can determine that a line defect has occurred if the counted number of pulses of the test output signal Data1 is 25, which is less than the reference number of 26, and can output a fail flag as a result of the line defect determination.

Meanwhile, the defect determination circuit 1220 can also detect a defect position where a line defect has occurred based on the result of comparing the counted number of pulses of the test output signal Data1 with the reference number.

For example, if the test output signal Data1 is a test output signal corresponding to the first to 26-th main drivers, and the counted number of pulses of the test output signal Data1 is 9, the defect determination circuit 1220 can determine that a defect has occurred in a line corresponding to the 10-th main driver, and can output information on the defect location where the line defect has occurred along with a fail flag.

In addition, if the counted number of pulses of the test output signal Data1 is 25, the defect determination circuit 1220 can determine that a defect has occurred in a line corresponding to the 26-th main driver, and can output information on the location where the line defect has occurred along with a fail flag.

Embodiments of the present disclosure can be described as follows.

A display device according to embodiments of the present disclosure can include a display panel including a plurality of main drivers disposed in each of a plurality of unit driving areas, and a timing controller providing a synchronization signal and a clock signal to each of the plurality of main drivers through at least one first signal line. Here, the timing controller can receive, through a second signal line, a test output signal based on a test output pulse output at different timings from at least two main drivers among the plurality of main drivers.

The timing controller can provide, in a test mode, a test pulse to each of the at least two main drivers through the at least one first signal line.

At least one of the plurality of main drivers can include a clock buffer for receiving a test pulse from the timing controller and delaying the test pulse, and a first multiplexer for outputting the delayed test pulse as the test output pulse.

The clock buffer can include at least one D-flip-flop.

Each of the clock buffers disposed in the at least two main drivers can include a different number of D-flip-flops.

The clock buffer can further include a second multiplexer connected to an output terminal of the at least one D-flip-flop.

Each of the clock buffers disposed in the at least two main drivers can receive a reference clock signal from the timing controller through a third signal line.

At least two main drivers can include first to M-th drivers, wherein M is a positive integer of 2 or greater, and the test output signal can include the test output pulse output from each of the first to M-th drivers at each of the first to M-th timings.

The timing controller can count the number of pulses of the test output signal output from the at least two main drivers through the second signal line, and determine a defect of a line connected to the at least two main drivers based on the counted number of pulses.

The timing controller can compare the counted number of pulses with a reference number, and determine the defect of the line connected to at least two main drivers based on a result of a comparison.

The timing controller can determine that the defect has occurred in the line connected to at least two main drivers if the counted number of pulses is less than the reference number.

The timing controller can determine a location of a defective line among the lines connected to the at least two main drivers based on a result of a comparison.

Each of the plurality of main drivers can receive, through the at least one first signal line, one corresponding synchronization signal among first to n-th synchronization signals, and one corresponding clock signal among first to n-th clock signals, wherein n is a positive integer greater than or equal to 2 and $n \leq M$.

The display panel can further include a plurality of sub-drivers disposed in each of the plurality of unit driving areas and receiving the synchronization signal and the clock signal from a corresponding main driver among the plurality of main drivers.

The plurality of main drivers can be located in a display area divided into the plurality of unit driving areas.

A display device according to embodiments of the present disclosure can include a plurality of main drivers disposed in each of a plurality of unit driving areas and including a clock buffer for delaying a test pulse provided through at least one first signal line, and a plurality of sub-drivers disposed in each of the plurality of unit driving areas and electrically connected to a corresponding main driver among the plurality of main drivers.

At least one of the plurality of main drivers can further include a multiplexer that outputs the delayed test pulse as a test output pulse.

The display device according to embodiments of the present disclosure can further include a timing controller that provides the test pulse to at least two main drivers among the plurality of main drivers and receives a test output signal based on a test output pulse output at different timings from the at least two main drivers through a second signal line.

The timing controller can include a counting circuit for counting the number of pulses of the test output signal output from at least two main drivers, and a defect determination circuit for comparing the counted number of pulses with a reference number and determining a defect in a line connected to at least two main drivers based on a result of a comparison.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure.

What is claimed is:

1. A display device comprising:

a display panel including a plurality of main drivers disposed in each of a plurality of unit driving areas; and a timing controller configured to provide a synchronization signal and a clock signal to each of the plurality of main drivers through at least one first signal line, wherein the timing controller is configured to receive, through a second signal line, a test output signal based on a test output pulse output at different timings from at least two main drivers among the plurality of main drivers, and wherein the timing controller counts a number of pulses of the test output signal output from the at least two main drivers through the second signal line, and determines a defect of a line connected to the at least two main drivers by comparing the counted number of pulses with a reference number.

2. The display device of claim 1, wherein the timing controller provides, in a test mode, a test pulse to each of the at least two main drivers through the at least one first signal line.

3. The display device of claim 1, wherein each of the at least two main drivers includes:

a clock buffer configured to receive a test pulse from the timing controller and delay the test pulse; and a first multiplexer configured to output the delayed test pulse as the test output pulse.

4. The display device of claim 3, wherein the clock buffer includes at least one D-flip-flop.

5. The display device of claim 3, wherein the clock buffers disposed in the at least two main drivers include different numbers of D-flip-flops.

6. A display device comprising:

a display panel including a plurality of main drivers disposed in each of a plurality of unit driving areas; and a timing controller configured to provide a synchronization signal and a clock signal to each of the plurality of main drivers through at least one first signal line, wherein the timing controller is configured to receive, through a second signal line, a test output signal based on a test output pulse output at different timings from at least two main drivers among the plurality of main drivers, wherein each of the at least two main drivers includes:

a clock buffer configured to receive a test pulse from the timing controller and delay the test pulse; and a first multiplexer configured to output the delayed test pulse as the test output pulse, and wherein the clock buffer includes at least one D-flip-flop and includes a second multiplexer connected to an output terminal of the at least one D-flip-flop.

7. The display device of claim 3, wherein each of the clock buffers disposed in the at least two main drivers receives a reference clock signal from the timing controller through a third signal line.

8. The display device of claim 1, wherein the at least two main drivers include first to M-th drivers, where M is a positive integer equal to or greater than 2, and wherein the test output signal includes the test output pulse output from each of the first to M-th drivers at each of first to M-th timings.

9. The display device of claim 1, wherein the timing controller determines that the defect has occurred in the line connected to the at least two main drivers when the counted number of pulses is less than the reference number.

10. The display device of claim 1, wherein the timing controller determines a location of a defective line among lines connected to the at least two main drivers based on a result of the comparison of the counted number of pulses with the reference number.

11. The display device of claim 8, wherein each of the plurality of main drivers receives, through the at least one first signal line, one corresponding synchronization signal among first to n-th synchronization signals, and one corresponding clock signal among first to n-th clock signals, where n is a positive integer greater than or equal to 2 and n≤M.

12. The display device of claim 1, wherein the display panel further includes a plurality of sub-drivers disposed in each of the plurality of unit driving areas and configured to receive the synchronization signal and the clock signal from a corresponding main driver among the plurality of main drivers.

13. The display device of claim 1, wherein the plurality of main drivers are located in a display area divided into the plurality of unit driving areas.

14. A display device comprising:

a plurality of main drivers disposed in each of a plurality of unit driving areas, and including a clock buffer for delaying a test pulse provided through at least one first signal line;

a plurality of sub-drivers disposed in each of the plurality of unit driving areas, and electrically connected to a corresponding main driver among the plurality of main drivers; and a timing controller configured to provide the test pulse to at least two main drivers among the plurality of main drivers, and receive a test output signal based on a test output pulse output at different timings from the at least two main drivers through a second signal line, wherein the timing controller includes:

a counting circuit configured to count a number of pulses of the test output signal output from the at least two main drivers; and a defect determination circuit configured to compare the counted number of pulses with a reference number, and determine a defect in a line connected to the at least two main drivers based on a result of the comparison of the counted number of pulses with the reference number.

15. The display device of claim 14, wherein at least one of the plurality of main drivers further include a multiplexer configured to output the delayed test pulse as a test output pulse.

16. The display device of claim 6, wherein the timing controller determines a location of a defective line among lines connected to the at least two main drivers based on a comparison of the number of pulses of the test output signal output from the at least two main drivers with a reference number.

* * * * *